US012158577B2

(12) United States Patent
Klug

(10) Patent No.: US 12,158,577 B2
(45) Date of Patent: *Dec. 3, 2024

(54) DISPLAY SYSTEM WITH LOW-LATENCY PUPIL TRACKER

(71) Applicant: Magic Leap, Inc., Plantation, FL (US)

(72) Inventor: Michael Anthony Klug, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,868

(22) Filed: Nov. 2, 2023

(65) Prior Publication Data
US 2024/0069334 A1 Feb. 29, 2024

Related U.S. Application Data

(63) Continuation of application No. 17/962,285, filed on Oct. 7, 2022, now Pat. No. 11,860,359, which is a (Continued)

(51) Int. Cl.
G02B 27/00 (2006.01)
G02B 27/01 (2006.01)

(52) U.S. Cl.
CPC ..... *G02B 27/0093* (2013.01); *G02B 27/0172* (2013.01); G02B 2027/0138 (2013.01); G02B 2027/014 (2013.01)

(58) Field of Classification Search
CPC ............ G02B 27/0093; G02B 27/0172; G02B 2027/0138; G02B 2027/014
See application file for complete search history.

(56) References Cited

U.S. PATENT DOCUMENTS 5,748,372 A 5/1998 Kitagawa
6,850,221 B1 2/2005 Tickle
(Continued)

FOREIGN PATENT DOCUMENTS

JP H07311361 A 11/1995
JP 2002318365 A 10/2002
(Continued)

OTHER PUBLICATIONS

ARToolKit: https://web.archive.org/web/20051013062315/http://www.hitl.washington.edu:80/artoolkit/documentation/hardware.htm, archived Oct. 13, 2005.
(Continued)

*Primary Examiner* — Dmitriy Bolotin
(74) *Attorney, Agent, or Firm* — Tobias Intellectual Property Law, PLLC

(57) ABSTRACT

A display system aligns the location of its exit pupil with the location of a viewer's pupil by changing the location of the portion of a light source that outputs light. The light source may include an array of pixels that output light, thereby allowing an image to be displayed on the light source. The display system includes a camera that captures images of the eye and negatives of the images are displayed by the light source. In the negative image, the dark pupil of the eye is a bright spot which, when displayed by the light source, defines the exit pupil of the display system. The location of the pupil of the eye may be tracked by capturing the images of the eye, and the location of the exit pupil of the display system may be adjusted by displaying negatives of the captured images using the light source.

20 Claims, 18 Drawing Sheets

Related U.S. Application Data continuation of application No. 16/978,440, filed as application No. PCT/US2019/020376 on Mar. 1, 2019, now Pat. No. 11,467,398.

(60) Provisional application No. 62/638,607, filed on Mar. 5, 2018.

(56) References Cited

U.S. PATENT DOCUMENTS

| | | |
|---|---|---|
| 7,639,208 B1 | 12/2009 | Ha et al. |
| 9,081,426 B2 | 7/2015 | Armstrong |
| 9,250,445 B2 | 2/2016 | Tosaya et al. |
| 9,846,307 B2 | 12/2017 | Tremblay et al. |
| 10,254,547 B2 | 4/2019 | Tremblay et al. |
| 11,467,398 B2 | 10/2022 | Klug |
| 2002/0109819 A1 | 8/2002 | Tuval |
| 2006/0028436 A1 | 2/2006 | Armstrong |
| 2007/0081123 A1 | 4/2007 | Lewis |
| 2010/0033830 A1 | 2/2010 | Yung |
| 2010/0149073 A1 | 6/2010 | Chaum et al. |
| 2012/0127062 A1 | 5/2012 | Bar-Zeev et al. |
| 2012/0162549 A1 | 6/2012 | Gao et al. |
| 2013/0082922 A1 | 4/2013 | Miller |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2014/0071539 A1 | 3/2014 | Gao |
| 2014/0177023 A1 | 6/2014 | Gao et al. |
| 2014/0218468 A1 | 8/2014 | Gao et al. |
| 2014/0267420 A1 | 9/2014 | Schowengerdt et al. |
| 2014/0375542 A1 | 12/2014 | Robbins et al. |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0309263 A2 | 10/2015 | Abovitz et al. |
| 2015/0326570 A1 | 11/2015 | Publicover et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0033771 A1 | 2/2016 | Tremblay et al. |
| 2016/0238845 A1 | 8/2016 | Alexander et al. |
| 2017/0052377 A1 | 2/2017 | Amitai |
| 2017/0293147 A1 | 10/2017 | Tremblay et al. |
| 2017/0315361 A1 | 11/2017 | Gao et al. |
| 2018/0081322 A1 | 3/2018 | Robbins et al. |
| 2018/0188688 A1 | 7/2018 | Maimone et al. |
| 2018/0196509 A1 | 7/2018 | Trail |
| 2019/0098267 A1 | 3/2019 | Poon et al. |
| 2021/0048668 A1 | 2/2021 | Klug |

FOREIGN PATENT DOCUMENTS

| | | |
|---|---|---|
| JP | 2002303819 A | 2/2005 |
| JP | 2004157173 A | 3/2006 |
| JP | 2017531817 A | 10/2017 |
| WO | 2015184412 A1 | 12/2015 |
| WO | 2016179246 A1 | 11/2016 |
| WO | 2019173158 A1 | 9/2019 |

OTHER PUBLICATIONS

Azuma, "A Survey of Augmented Reality," Teleoperators and Virtual Environments 6, 4 (Aug. 1997), pp. 355-385. https://web.archive.org/web/20010604100006/http://www.cs.unc.edu/ azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/raskar/book/BimberRaskarAugmentedRealityBook.pdf.

Hou, et al., "Geometrical waveguide in See-through Head-mounted display: A Review," Proc. of SPIE, vol. 10021, Oct. 31, 2016.

International Preliminary Report for Patentability for PCT Application No. PCT/US 19/20376, dated Sep. 8, 2020.

International Search Report and Written Opinion for PCT Application No. PCT/US 19/20376, dated May 23, 2019.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

JP2020-542905 Office Action mailed Jan. 26, 2023.

Tanriverdi and Jacob, "Interacting With Eye Movements in Virtual Environments," Department of Electrical Engineering and Computer Science, Tufts University, Medford, MA-paper/Proc. Amc Chi 2000 Human Factors in Computing Systems Conference, pp. 265-272, Addison-Wesley/ACM Press (2000).

Wikipedia: "Eye tracking," URL:https://web.archive.org/web/2013020131958/https://en.wikipedia.org/wiki/Eye_tracking, retrieved Dec. 11, 2018, webpage last updated Jan. 31, 2013.

EP19765005.4 Examination Report dated Jan. 2, 2024.

EP19765005.4 Extended European Search Report dated Nov. 5, 2021.

JP2023-103301 Office Action mailed May 15, 2021.

DISPLAY SYSTEM WITH LOW-LATENCY PUPIL TRACKER

PRIORITY CLAIM

This application is a continuation of U.S. patent Ser. No. 16/978,440, filed Sep. 4, 2020, entitled DISPLAY SYSTEM WITH LOW-LATENCY PUPIL TRACKER, which is a 371 of International Application No. PCT/US2019/020376, filed Mar. 1, 2019, entitled DISPLAY SYSTEM WITH LOW-LATENCY PUPIL TRACKER, which claims the benefit of priority to U.S. Provisional Patent Application No. 62/638,607, filed Mar. 5, 2018, entitled DISPLAY SYSTEM WITH LOW-LATENCY PUPIL TRACKER, which is hereby incorporated by reference herein in its entirety.

INCORPORATION BY REFERENCE

This application incorporates by reference the entirety of each of the following patent applications: U.S. application Ser. No. 14/555,585 filed on Nov. 27, 2014, published on Jul. 23, 2015 as U.S. Publication No. 2015/0205126; U.S. application Ser. No. 14/690,401 filed on Apr. 18, 2015, published on Oct. 22, 2015 as U.S. Publication No. 2015/0302652; U.S. application Ser. No. 14/212,961 filed on Mar. 14, 2014, now U.S. Pat. No. 9,417,452 issued on Aug. 16, 2016; U.S. application Ser. No. 14/331,218 filed on Jul. 14, 2014, published on Oct. 29, 2015 as U.S. Publication No. 2015/0309263; U.S. application Ser. No. 15/789,895 filed on Oct. 20, 2017; U.S. patent application Ser. No. 15/442,461 filed on Feb. 24, 2017; U.S. Provisional Patent Application No. 62/474,419 filed on Mar. 21, 2017; U.S. application Ser. No. 15/271,802 filed on Sep. 21, 2016, published as U.S. Publication No. 2017/0082858; and U.S. Publication No. 2015/0346495, published Dec. 3, 2015.

BACKGROUND

Field

The present disclosure relates to display systems and, more particularly, to augmented and virtual reality display systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario, AR image content may be blocked by or otherwise be perceived as interacting with objects in the real world.

Referring to FIG. 1, an augmented reality scene 10 is depicted wherein a user of an AR technology sees a real-world park-like setting 20 featuring people, trees, buildings in the background, and a concrete platform 30. In addition to these items, the user of the AR technology also perceives that he "sees" "virtual content" such as a robot statue 40 standing upon the real-world platform 30, and a cartoon-like avatar character 50 flying by which seems to be a personification of a bumble bee, even though these elements 40, 50 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

SUMMARY

Some embodiments include a method for displaying images to a viewer. The method comprises providing a display device comprising a light source configured to display an image. The location of a pupil of an eye of the viewer is aligned with an exit pupil of the display device. Aligning the exit pupil and the pupil of the eye comprises capturing an image of an eye of the viewer; and displaying a negative image of the image of the eye on the light source. Light forming the negative image is modulated to provide image content to the eye of the viewer.

Some other embodiments include a method for displaying images to a viewer. The method comprises providing a display device comprising a light source configured to output light, from a plurality of different light output locations, to an eye of the viewer. The location of an exit pupil of the display device is aligned with the position of a pupil of the eye of the viewer. Aligning comprises capturing an image of the eye; and selectively emitting light from one or more locations of the light source corresponding to a location of the pupil of the eye in the image of the eye.

Yet other embodiments include a head-mounted display system comprising an eye imaging device configured to capture images of an eye of a user. The display system also comprises a light source comprising a plurality of selectively-activated light-emitting locations configured to emit light to form a negative image of the eye. A spatial light modulator is configured to display image content to the user by encoding image information in the light forming the negative image of the eye.

Additional examples of embodiments include:

Example 1. A method for displaying images to a viewer, the method comprising:
  providing a display device comprising a light source configured to display an image;
  aligning a location of a pupil of an eye of the viewer with an exit pupil of the display device, wherein aligning the location comprises:
    capturing an image of an eye of the viewer; and
    displaying a negative image of the image of the eye on the light source; and
  modulating light forming the negative image to provide image content to the eye of the viewer.

Example 2. The method of Embodiment 1, wherein modulating light forming the negative image comprises propagating the light through a spatial light modulator.

Example 3. The method of Embodiment 1, wherein the light source is a spatial light modulator, wherein the negative image is displayed on the spatial light modulator.

Example 4. The method of Embodiment 1, wherein the negative image of the eye defines a location of an exit pupil of the display, wherein aligning the location of the pupil of the eye is performed continuously while providing image content to the eye, wherein capturing the image of the eye and displaying the negative of the image are performed 60 or more times per second.

Example 5. A method for displaying images to a viewer, the method comprising:

provide a display device comprising a light source configured to output light, from a plurality of different light output locations, to an eye of the viewer;

aligning a location of an exit pupil of the display device with a position of a pupil of the eye of the viewer, where aligning comprises:

capturing an image of the eye; and selectively emitting light from one or more locations of the light source corresponding to a location of the pupil of the eye in the image of the eye.

Example 6. The method of embodiment 5, further comprising:

modulating the light emitted from the one or more locations; and propagating the modulated light to the eye to provide image content to the viewer.

Example 7. The method of Embodiment 5, wherein the light source comprises a spatial light modulator.

Example 8. The method of Embodiment 5, further comprising converting the image of the eye into a negative image, wherein selectively emitting light comprises displaying the negative image on the light source.

Example 9. A head-mounted display system comprising:
an eye imaging device configured to capture images of an eye of a user;
a light source comprising a plurality of selectively-activated light-emitting locations configured to emit light to form a negative image of the eye; and
a spatial light modulator configured to display image content to the user by encoding image information in the light forming the negative image of the eye.

Example 10. The display system of Embodiment 9, wherein the eye imaging device comprises a camera.

Example 11. The display system of Embodiment 9, wherein the light source is an other spatial light modulator.

Example 12. The display system of Embodiment 11, wherein the other spatial light modulator is an emissive spatial light modulator.

Example 13. The display system of Embodiment 12, wherein the emissive spatial light modulator is an LED array.

Example 14. The display system of Embodiment 9, further comprising:

light source optics configured to collimate light propagating from the light source to the spatial light modulator;

light source relay optics configured to receive light from the spatial light modulator and to form an image of the light source; and pupil relay optics configured to receive light from the light source relay optics and to provide simultaneous images of the light source and spatial light modulator to the eye.

Example 15. The display system of Embodiment 9, further comprising a light guide configured to direct light from the spatial light modulator towards an eye of the user.

Example 16. The display system of Embodiment 15, wherein the light guide has optical power and is configured to output light with a divergent wavefront.

Example 17. The display system of Embodiment 16, further comprising a plurality of the light guides, wherein at least some of the plurality of light guides have different optical power from others of the plurality of light guides.

Example 18. The display system of Embodiment 9, further comprising a frame configured to mount on a head of the user, wherein at least a light capturing portion of the eye imaging device is attached to the frame, and wherein the spatial light modulator is attached to the frame.

Example 19. The display system of Embodiment 9, wherein the display system is configured to threshold the captured images of the eye to convert a captured image to a corresponding negative image.

Example 20. The display system of Embodiment 9, wherein the light source is a binary spatial light modulator, wherein the selectively-activated light-emitting locations have an on state and an off state.

DETAILED DESCRIPTION

Figure 1:
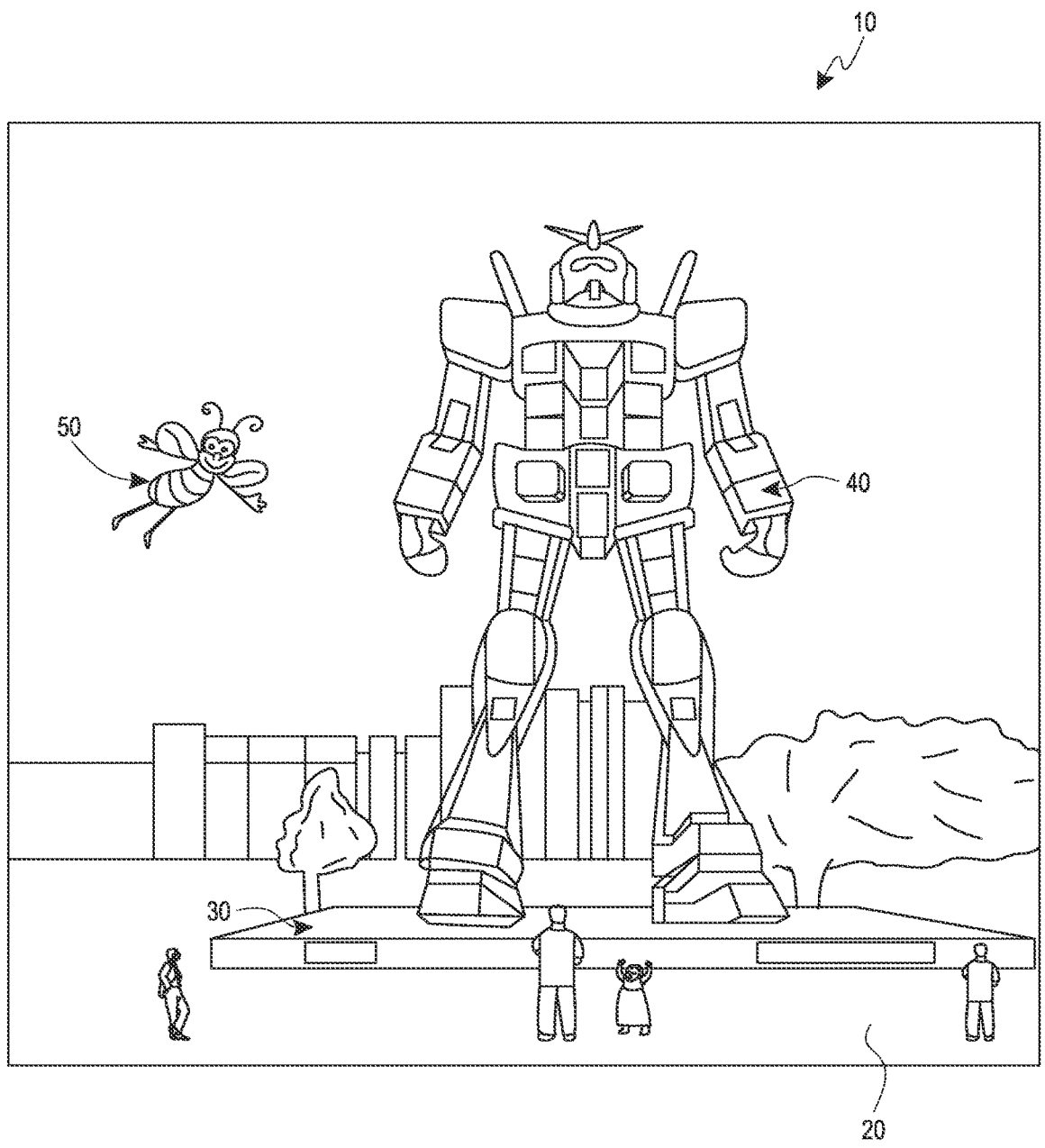
FIG. 1 illustrates a user's view of augmented reality (AR) through an AR device.

Virtual and augmented reality near-eye display systems, including mixed reality display systems, preferably are able to provide image information to the eye of a viewer with high optical quality, while also allowing continuous reception of that image information as the viewer's eye moves. For example, the user is preferably able to continue to receive image information (e.g., to view displayed images) even when their eyes move relative to the display. The image information may take the form of modulated light from a light source. For example, light from a light source may be may be modulated by a spatial light modulator to encode the light with the image information before directing the modulated light into the eye of the viewer. To form a compact and/or portable display system, the display system preferably efficiently utilizes the light from the light source. High efficiency reduces the power requirements of the light source while still producing a desirably bright image. The more efficient the light utilization, the smaller and longer-operating the display system may generally be.

It will be appreciated that modulated light may be provided to the viewer's eye through an exit pupil of the display system. For example, the display system may utilize a projection/relay system that transfers image light from the spatial light modulator to an infinity or near-infinity focused image that is viewed by the viewer through an exit pupil formed by an upstream projector optical system. In these optical systems, the exit pupil of the system may be small (e.g., 0.5-2 mm), which may require careful alignment of the viewer's ocular pupil (the pupil of an eye of the viewer) with the exit pupil, to preferably allow all of the light exiting the display system to enter the ocular pupil. Misalignments of the exit pupil and the ocular pupil can cause some of the light exiting the display system to not be captured by the viewer's eye, which may cause undesirable optical artifacts, such as vignetting.

Pupil expansion may be employed in the display system to relax alignment requirements. For example, a pupil-expanding eyepiece may be used to diffractively sample input light into a plurality of beamlets across an eyepiece, which may be formed by one or more light guides. For example, pupil expansion may involve replicating rays of light across the eyepiece. An "eye-box" may be described as an area or volume in which the viewer places his/her pupil in order to see the image formed using the spatial light modulator, e.g., by capturing the beamlets exiting the eyepiece. The large size of the eyebox allows the viewer's pupil to move and rotate without the viewer perceiving significant vignetting. This, however, is achieved at the cost of efficient light utilization, since the viewer's eye will only sample a small percentage of the light present in the eyebox at a given instant in time. Thus, much of the light emitted by the light source and later outputted by the eyepiece does not enter the ocular pupil of the viewer.

The optical elements used to replicate and output rays of light from a light guide of an eyepiece may also contribute to the inefficient light utilization. For example, the use of diffractive structures themselves may contribute to light utilization inefficiencies since the diffractive structures typically do not direct all light in a single desired direction, nor do diffractive structures typically uniformly direct light of different wavelengths in a desired direction. In addition, a uniform distribution and flux of light out of the eyepiece is desirable to provide high perceived image quality, including high uniformity in image brightness as the ocular pupil moves across the eye-box. In some configurations, the optical elements that out-couple light out of the light guide may be diffractive structures with low diffraction efficiencies, in order to facilitate the uniform distribution of light across an eye-box and out of the eyepiece. Thus, similar to the above, only a small portion of the light coupled into a light guide from the light source is outputted out of the light guide and into the ocular pupil at a given location across the light guide. In some configurations, the desire for uniformity may result in use of diffractive elements with diffraction efficiencies that are so low that some of the light coupled into the light guide is not outputted to the viewer before passing completely across the light guide.

Advantageously, in some embodiments, a display system provides highly efficient light utilization using an exit pupil that tracks and aligns with the ocular pupil of the viewer. The alignment may be achieved using a light source that comprises a plurality or an array of selectively-activated light output locations. Changing the location at which light is outputted by the light source changes the lateral location of the exit pupil, thereby allowing the exit pupil to be moved to track the ocular pupil.

In some embodiments, each of the selectively-activated light output locations of the light source may function as a pixel, and selectively activating different ones of these light output locations may allow an image to be displayed by the light source. In addition to the light source, the display system may comprise an imaging device for capturing images of the eye. The captured images are converted into negative images, which are displayed by the light source. In the negative images, the dark pupil of the eye appears as a bright spot which, when displayed by the light source, defines the exit pupil of the display system. Thus, the location of the ocular pupil may effectively be determined by capturing images of the eye, and the location of the exit pupil of the display system may be set by using the light source to display negatives of those captured images. In operation, in some embodiments, images of the viewer's eyes may be continuously captured and the displayed negatives of the captures images may similarly be updated continuously, thereby allowing the position of the exit pupil to be adjusted and to continuously track the position of the ocular pupil. In some embodiments, the light outputted by the light source may then be modulated to encode image information before that light exits the display system. It will be appreciated that for displays that display images to both eyes of a viewer, in some embodiments, the system may comprise dedicated imaging devices, light sources, and related objects for each eye.

Advantageously, various embodiments of the display systems disclosed herein can provide a number of benefits. For example, the display systems may provide a highly efficient utilization of light. Because the exit pupil moves to track the location of the viewer's eyes, the display system may not require pupil-expansion across a large area encompassing the possible locations of the ocular pupil. Rather than attempting to uniformly output light across a large eye-box, in some embodiments, substantially all of the light outputted by an emissive light source is available to be directed into the viewer's eyes, depending on any modulation of that light to encode image information. In addition, the higher light utilization efficiency can allow for a more compact device and longer run time with a given amount of stored power.

The ability to track and align the viewer's ocular pupil with the exit pupil may also improve image quality. For example, maintaining alignment of the ocular in exit pupils may allow substantially all of the light exiting the exit pupil to be captured by the viewer's eyes, thereby decreasing the occurrence of optical artifacts, e.g., vignetting. The ocular and exit pupil tracking and alignment also allows the use of specular optical relays to produce the exit pupil and may obviate the need for leaky diffractive structures. This may obviate the difficulties of diffractive structures in providing coherent light output. In addition, because only light for forming the single exit pupil is utilized to display an image, the amount of light propagating through the system is reduced, which may reduce the amount of unintentionally scattered light reaching the viewer's eyes. This reduction in unintentionally scattered light can advantageously increase the perceived contrast of displayed images.

Various embodiments disclosed herein may also advantageously be compatible with a wide variety of optical combiners, as discussed herein. In addition, because the tracking and alignment of the exit and ocular pupils principally involves relatively simple processes related to capturing, inverting, and displaying negative images of the eye, the tracking and alignment may advantageously be performed with low latency and utilize low amounts of processing resources.

Reference will now be made to the drawings, in which like reference numerals refer to like parts throughout. Unless indicated otherwise, the drawings are schematic and not necessarily drawn to scale.

Figure 2A:
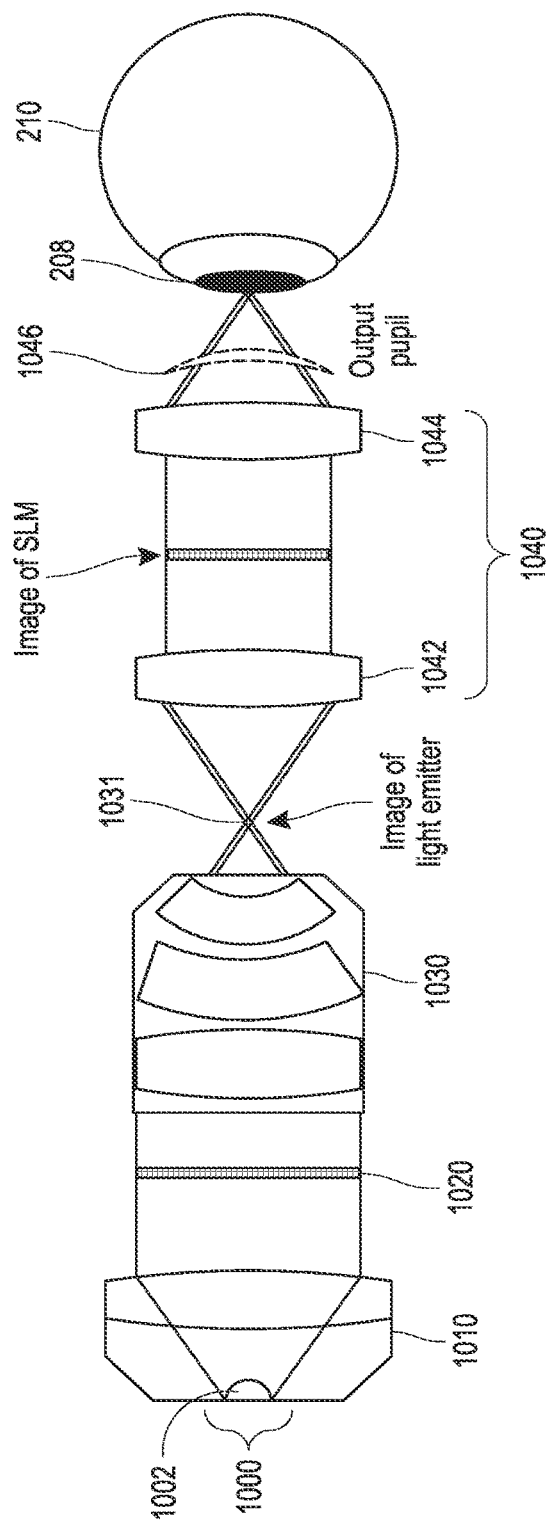
FIG. 2A illustrates an example of a display system having a light source having a single light emitter.

FIG. 2A illustrates an example of a display system having a light source with a single light emitter. The display system includes a light source 1000 having a light emitter 1002. The light emitter 1002 emits the light that will ultimately enter an ocular pupil 208 of an eye 210 of a viewer, to form images in that eye 210.

The display system may also include light source condensing/collimating optics 1010. The light source condensing/collimating optics 1010 may be configured to collimate light emitted by the light emitter 1002 before the light reaches an image spatial light modulator (SLM) 1020.

The image SLM 1020 is configured to modulate light from the light source 1000. The image SLM 1020 may comprise an array of pixel elements, each of which may modify light interacting with (e.g., incident on, or propagating through) the pixel element. Images may be formed by modulating the light (e.g., changing the intensity of the light, selectively transmitting light of certain wavelengths and/or polarizations, etc.). As a result, the image SLM 1020 may be said to encode the light with image information before the light reaches the eye 210. It will be appreciated that the image SLM 1020 may be transmissive or reflective. Where the image SLM 1020 is reflective, additional optical elements (e.g., a beam splitter and related optical elements) may be provided to direct the light from the light source 1000 to the image SLM 1020 and towards the eye 210. Additional details regarding the use of reflective spatial light modulators may be found in, e.g., U.S. patent application Ser. No. 15/442,461, filed on Feb. 24, 2017, the entire disclosure of which is incorporated by referenced herein. In some embodiments, the image SLM 1020 may take the form of a liquid crystal display (LCD), including a liquid crystal on silicon (LCOS) display.

The display system may also include relay optics or lens structure 1030 configured to produce an output or exit pupil, which is also an image 1031 of the light emitter 1002. A viewer placing his/her ocular pupil 208 at the location of the exit pupil (at the image 1031) would see an infinity-focused image of the image SLM 1020. Such configurations may be utilized in virtual reality or other display systems in which the viewer is provided images directly from the system without, e.g., combining the image content with other light, such as that from the ambient environment.

In some embodiments, a relay lens system 1040 may be provided in the path of light between the relay optics 1030 and the ocular pupil 208 of the viewer. The relay lens system 1040 may be, e.g., a 4F relay system. In some embodiments, the relay lens system 1040 may be understood to schematically represent an eyepiece, e.g., a combiner eyepiece, examples of which are discussed further herein. The combiner eyepiece advantageously allows a view of the ambient environment by transmitting light from this environment to one or both eyes of the viewer, while also allowing images outputted by the display system to be combined with that light. Such a display system may constitute an augmented reality display system.

With continued reference to FIG. 2A, as discussed above, the relay optics 1030 may be configured to form the image 1031 of the light emitter 1002, which may be between the relay optics 1030 and the relay lens system 1040. The relay lens system 1040 may include first and second lens 1042 and 1044, respectively. An image of the image SLM 1020 may reside between the first lens 1042 and the second lens 1044 of the relay lens system 1040. A viewer placing his/her ocular pupil 208 at the location of the exit pupil (that is, at the image of the light emitter 1002 provided by the relay lens system 1040) sees an infinity-focused image of the image SLM 1020.

In some embodiments, it may be desirable to focus the image of the SLM 1020 on a plane other than infinity. For such embodiments, a lens structure 1046 (e.g. a meniscus lens) may be provided in the path of light between the output of the relay lens system 1040 and the viewer. The lens structure 1046 may modify the focus of the image of the SLM 1020 at a desired depth plane. In some embodiments, the lens structure 1046 may be omitted, e.g., where the second lens 1044 focuses the image of the SLM 1020 at a desired depth plane. It will be appreciated that the first and second lens 1042 and 1044, in addition to other lenses disclosed herein, may include one or more lens elements or groups of lens elements.

With continued reference to FIG. 2A, the location of the exit pupil may be determined by the location of the light emitter 1002. Laterally displacing the light emitter 1002 correspondingly shifts the location of the exit pupil. For example, placing the light emitter 1002 at different locations causes the light from the light emitter 1002 to take different paths through the various optical structures of the display system (e.g., the condensing/collimating optics 1010, the relay optics 1030, and the relay lens system 1040). As a result, shifting the position of the light emitter 1002 can cause a corresponding shift in the location of the exit pupil. A similar shift in the location of the exit pupil may also be achieved using one or more additional light emitters at different locations; that is, rather than shifting the light emitter 1002 to one or more other locations, other light emitters may be provided at those locations.

Figure 2B:
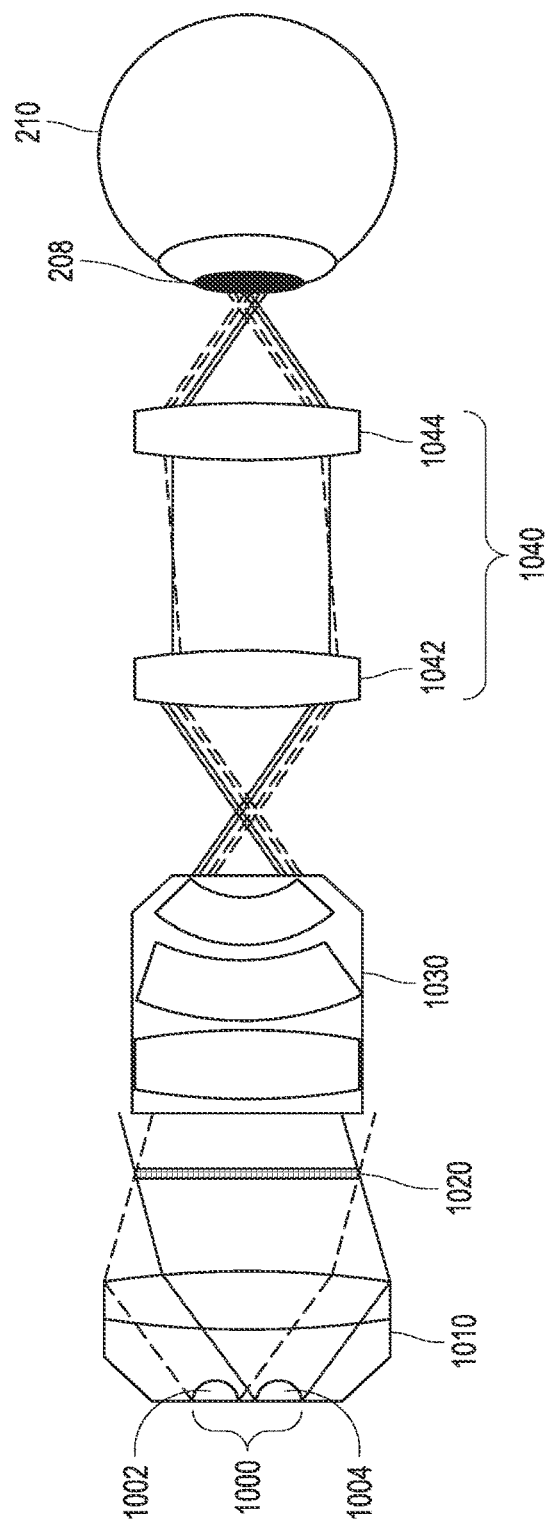
FIG. 2B illustrates an example of a display system having a light source with multiple light emitters which emit light from different locations.

FIG. 2B illustrates an example of a display system having a light source with multiple light emitters which emit light from different locations. The display system of FIG. 2B is similar to the display system of FIG. 2A except that the light source 1000 includes two light emitters, light emitters 1002 and 1004, at different locations. In this illustration, light from light emitter 1002 is shown as dashed lines, and light from light emitter 1000 is shown as solid lines. The light source condensing/collimating optics 1010 receives light from either light emitter and condenses/collimates that light such that it propagates to the image SLM 1020 as a collimated beam of light. However, because of the differences in location between light emitter 1000 and light emitter 1004, the light from each light emitter propagates towards the image SLM 1020 at different angles. As such, the relay optics 1030 forms images of both the light emitter 1002 and the light emitter 1004 between the relay optics 1030 and the relay lens system 1040, but these images of light emitters are offset from one another. In addition, images of the image SLM 1020 formed by light from each of the light emitters 1002 and 1004 may both reside between the first lens 1042 and the second lens 1044, with these images of the image SLM 1020 also being offset from one another. Depending on the spacing between the light emitters 1002 and 1004, light form both exit pupils may simultaneously enter the viewer's eye 210, and the viewer may continue to see a single image of the SLM, focused at infinity. The differences in the locations of the light emitters 1002 and 1004 provide exit pupils that are at different locations and the eye 210 may shift between the different exit pupils and the image of the image SLM 1020 will continue to be visible as the eye 210 shifts. Advantageously, the addition of the second light emitter 1004 may in effect expand the size of the exit pupil of the system.

In some embodiments, the light emitters 1002 and 1004 may be part of an array of light emitters. For example, the light source 1000 may be a spatial light modulator. The spatial light modulator forming the light source 1000 may be an emissive spatial light modulator, e.g., comprising pixels formed of light-emitting diodes (such as organic light-emitting diodes (OLEDs)) which spatially modulate light by outputting light of varying intensities and/or wavelengths from pixels at different locations across an array of the pixels. In some other embodiments, the spatial light modulator may be a transmissive or reflective SLM configured to modulate light provided by illumination optics.

Where the light source is a spatial light modulator, individual pixels, or groups of pixels, of the spatial light modulator may constitute the light emitters 1002 and 1004. As noted above, images of each of the light emitters 1002 and 1004 may provide respective corresponding exit pupils for the display system, with the locations of the exit pupils determined by the locations of the light emitters 1002 and 1004. As discussed above, the locations of the light emitters may be shifted by selectively activating light emitters (the different pixels) at different locations on the spatial light modulator. In addition, because the exit pupils are defined by images of the light emitters, the sizes of those light emitters also define the sizes of the exit pupils. Consequently, in some embodiments, the sizes and locations of the exit pupils may be set by selectively activating pixels of the spatial light modulator that forms the light source 1000.

For example, as discussed with reference to FIG. 2B, an image of the light emitters (the light source SLM 1000 with its activated pixels in this case) may be relayed through the display system. When the viewer places his/her eye 210 in the image of the SLM forming the light source, they will see an infinity-focused image of the image SLM 1020. The size of the exit pupil will be determined by the number of pixels that are activated on the light source 1000's SLM, also referred to herein as the light source SLM 1000. The position of the exit pupil may be determined by which pixels on the light source SLM 1000 are activated. Thus, if a single pixel on the light source SLM 1000 is activated, a single, small exit pupil is formed at the viewer's eye when positioned in the image of the light source SLM 1000. If the single pixel is moved (that is, if that pixels deactivated and another single pixel at a different location on the light source SLM 1000 is activated), the exit pupil of the display system will correspondingly move. In all of these cases, the infinity-focused image of the image SLM will preferably remain stationary within the exit pupil and be visible through the exit pupil, wherever it may be and however large or small it may be.

Advantageously, the ability to laterally change the location of the exit pupil can provide advantages for image quality and/or energy efficiency. For example, the display system may be configured to change the location of the exit pupil so that it tracks the position of the ocular pupil. This may decrease the occurrence of optical artifacts, e.g., vignetting, and thereby increase perceived image quality and decrease unintended fluctuations in image brightness. In addition, by continuously tracking and aligning the ocular and exit pupils, the display system may avoid the use of low-efficiency diffractive optical elements. Moreover, where the light source comprises emissive light emitters (e.g., LEDs, including OLEDs), only those light emitters contributing light for the exit pupil may be activated at any given time. As a result, substantially all of the light emitted by the light source may be captured by the viewer's eyes, thereby increasing the light utilization efficiency of the display system.

In addition, utilizing a light source comprising a plurality of independently activated light emitters effectively allows the size of the light source to be changed, e.g., dynamically changed over the course of displaying images to the viewer. This changeability allows, e.g., the depth of field of the display system to be modified, e.g., continuously modified while displaying images to the viewer. For example, the size of the light source may be increased by activating a relatively large number of light emitters, while the size of the light source may be decreased by activating a smaller number of light emitters (e.g., a single light emitter). A larger light source would be expected to produce a shallow depth of field image of the SLM 1020, while a relatively small light source would be expected to produce a deep depth of field image of the SLM 1020. The ability to change the effective size of the light source may have advantages for managing the accommodative function of the viewer's eyes. For example, the sensitivity of the user's eyes to accommodative cues may be set at a relatively high level by utilizing a relatively large light source, while the sensitivity of the user's eyes to accommodative cues may be decreased by utilizing a relatively small light source. This may have advantages for, e.g., reducing the impact of accommodation-vergence mismatches. For example, where the accommodation-vergence mismatch is expected to exceed desirable threshold levels, the size of the light source may be decreased to decrease the sensitivity of the user to the accommodative cues associated with the mismatch.

It will be appreciated that a light source comprising a plurality of selectively-activated light emitters may be considered to function roughly as a display. Where the light source is a spatial light modulator, the light source may indeed be considered to be a type of display device. In some embodiments, the ocular pupil may be tracked by capturing images of the eye 210 of the viewer and displaying modified forms of those images on the light source SLM 1000. Because the ocular pupil is dark or black but the exit pupil should emit light, the display system may be configured to display negatives of the captured images of the eye 210 on the light source SLM 1000. In the negatives, relatively dark pixels or areas of the captured images appear relatively light or bright, and relatively light or bright pixels or areas of the captured images appear relatively dark. As a result, the dark ocular pupil may appear white or bright, while other areas of the eye 210 (such as the whites of the eyes) are dark. Thus, light emitters corresponding to the ocular pupil are activated (to emit light), while light emitters corresponding to other areas of the eye 210 are not activated (to not emit light).

Figure 3:
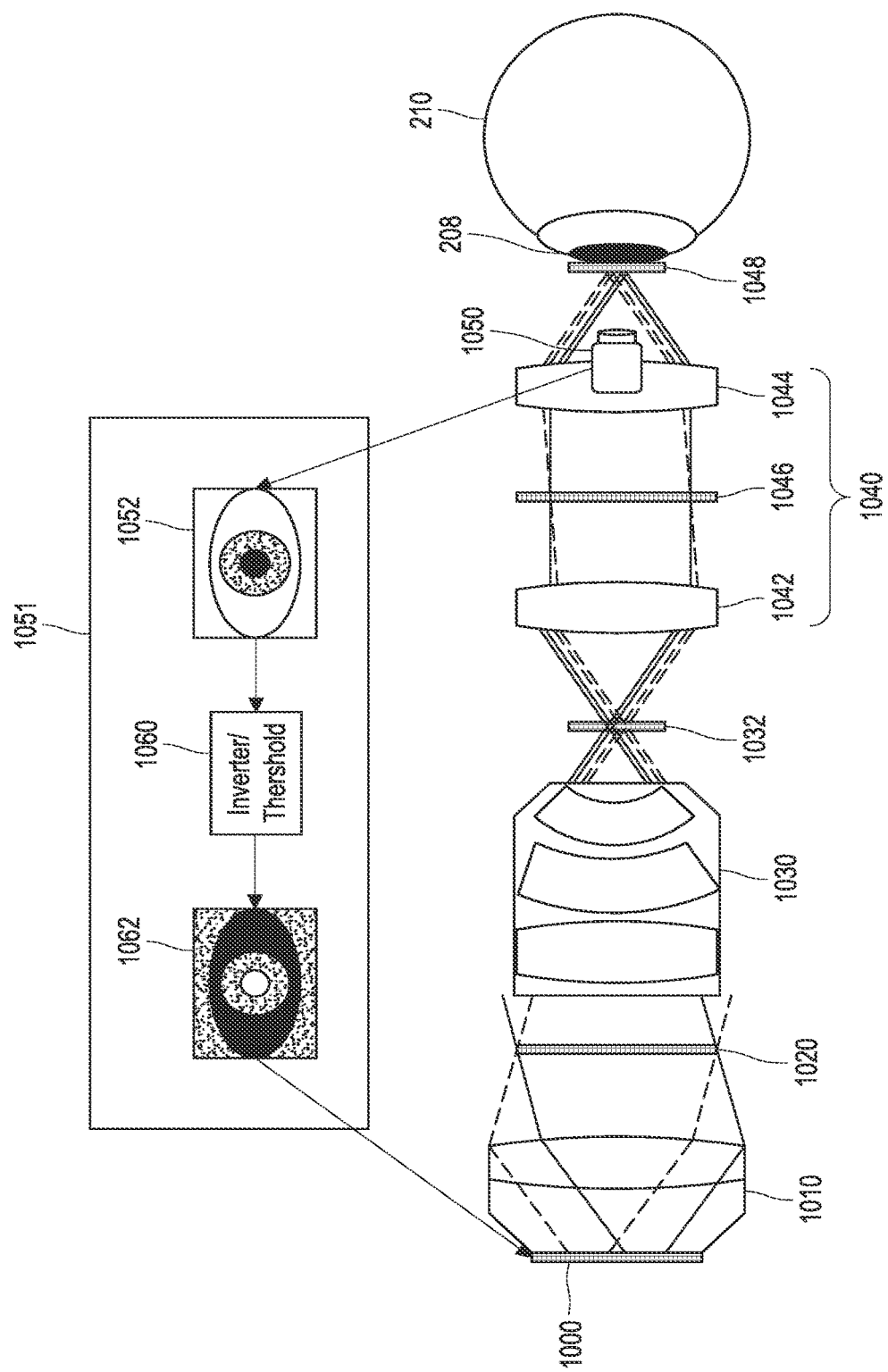
FIG. 3 illustrates an example of a display system having a camera for capturing images of a viewer's eye and a light source configured to display a negative of the captured image.

FIG. 3 illustrates an example of a display system having a camera for capturing images of a viewer's eye and a light source configured to display a negative of the captured image. The light source 1000 comprises a plurality of light emitters. For example, the light source 1000 may be an SLM, which may comprise a panel display which may include in array of light emitters such as LEDs or lasers. The light source 1000 displays a negative image of the viewer's eye 210. This negative image provides the exit pupil through which the image SLM 1020 is visible.

The display system includes an imaging device 1050 to capture images of the eye 210. In some embodiments, the imaging device 1050 may comprise a digital video camera and/or a digital still camera. In some embodiments, the imaging device 1050 may be configured to continuously capture images of the eye 210, or to capture such images at a desired rate. For example, the images may be captured and negatives of the images may be displayed at a sufficiently fast rate that updates to the negative images displayed by the light source SLM 1000 are not perceptible. In some embodiments, the negative images are updated at a rate greater than the flicker fusion threshold, e.g., greater than 60 times per second (or 60 Hz), our greater than 90 times per second (or 90 Hz).

With continued reference to FIG. 3, the display system comprises a processing unit 1051 configured to receive captured images and to convert those images into negative, preferably high contrast, images for display by the light source SLM 1000. The processing unit 1051 is in communication with the imaging device 1050 and receives a captured image 1052 (e.g., in the form of data representing the captured image) of the eye 210 from the imaging device 1050. In some embodiments, the captured image 1052 is a grayscale or black and white image. The processing unit 1051 includes an inverter 1060 configured to convert the captured image 1052 into a negative of that captured image, thereby forming the negative image 1062. For example, the normally black pupil now becomes white in the negative image 1062. The processing unit 1051 may be configured to then transmit the negative image 1062 (e.g., in the form of data representing the negative image) to the light source SLM 1000, which then displays the negative image 1062.

In some embodiments, the inverter 1060 may be configured to invert the intensity value of each pixel of the captured image 1052. As an example, for an 8-bit grayscale image having 256 grade levels and corresponding intensity values from 0-255, the inverter 1060 may be configured to invert the intensity of a pixel by reversing the intensity values; that is, an intensity value of X (X more than 0, the lower bound of possible intensity values), may be inverted by converting that value to a number that is X less than 255 (the upper bound of possible intensity values).

In some other embodiments, the inverter 1060 may be configured to perform thresholding. For example, the inverter 1060 may be configured to convert each "dark" pixel having an intensity less than a threshold value to a pixel having a particular higher intensity (e.g., the maximum intensity). Preferably, the threshold value is set at a level such that substantially only black pixels of the captured image 1052 representing the ocular pupil 208 are converted to white pixels having in the higher intensity. In some other embodiments, the light source SLM may be a binary SLM with pixels configured to provide only two levels of intensity (e.g., to provide only black and white, or on and off, states). The use of binary SLMs may obviate the need for thresholding.

In addition to inverting the captured image 1052 of the eye, in some embodiments, the processing unit 1051 may be configured to exclude, in the negative image, dark portions of the captured image that are not the ocular pupil 208. For example, the iris of the eye 210 may also include black portions. To exclude such parts of the iris from the negative image, the processing unit 1051 may be configured to perform image recognition and to determine, in real time, whether a pixel forms part of an image of the iris or whether the picture forms part of an image of the ocular pupil 208. In some embodiments, the processing unit 1051 may be configured to identify a round area that is substantially entirely black as the ocular pupil 208 and to only show this round area (using white pixels) in the negative image 1062.

Figure 17:
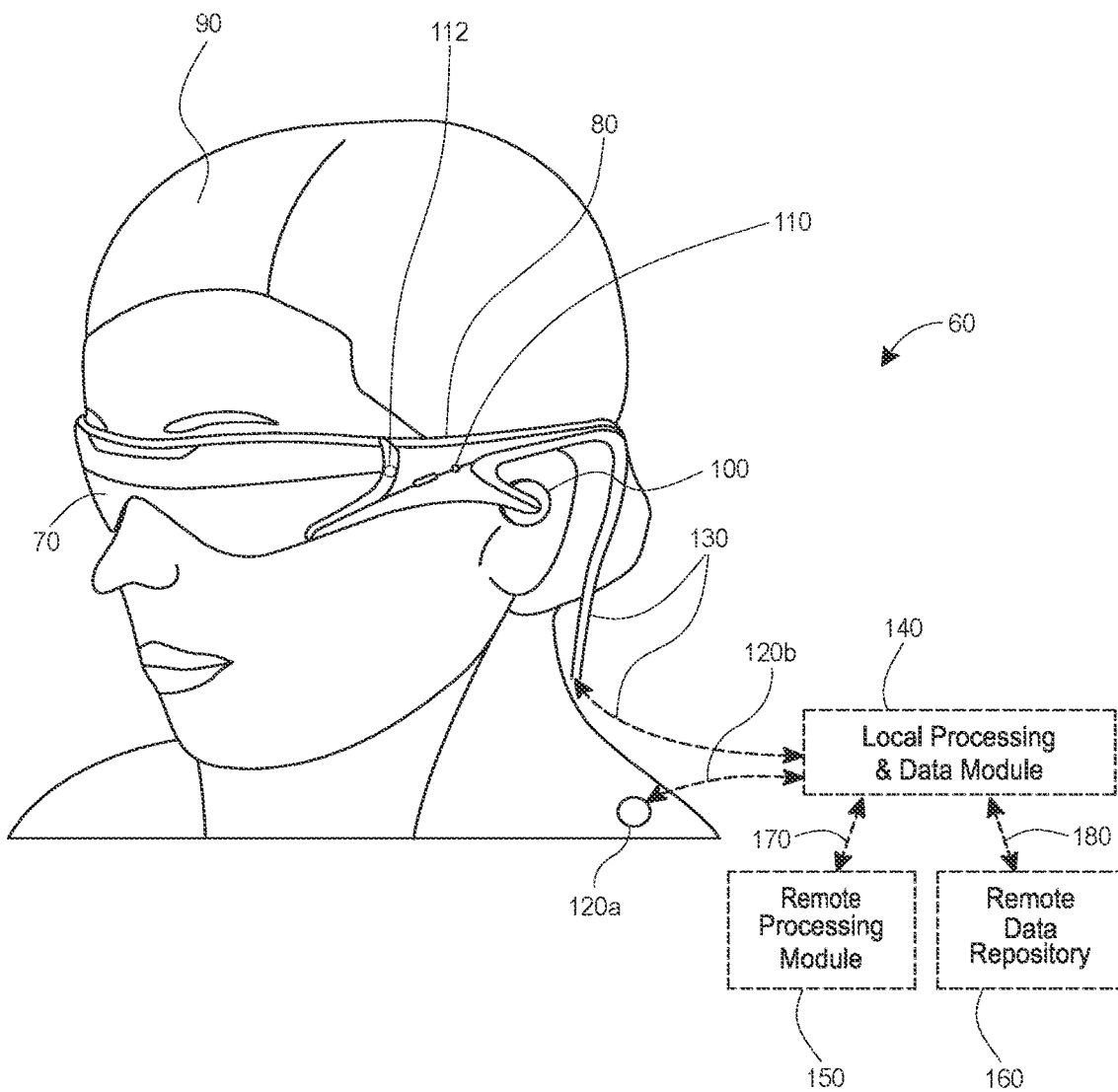
FIG. 17 illustrates an example of wearable display system.

In some embodiments, the processing unit 1051 may be part of the local processing and data module 140 and/or the remote processing module 150 (FIG. 17). In some other embodiments, the local processing unit 1051 may be part of the light source SLM 1000 itself. In such embodiments, transmitting the negative image 1062 for display by the light source SLM 1000 may encompass simply transmitting image information between circuitry (e.g., inverter circuitry and display circuitry) within the light source SLM 1000.

With continued reference to FIG. 3, the negative image 1062 may be displayed by the light source SLM 1000. As discussed herein, images of the light source SLM 1000 and image SLM 1020 may be relayed through the display system. For example, the relay optics 1030 forms images 1032 of the light source SLM 1000 between the relay optics 1030 and the relay lens system 1040. In addition, images of the image SLM 1020 are formed between the first lens 1042 and the second lens 1044 of the relay lens system 1040. The relay lens system 1040 also forms an image 1048 of the light source SLM 1000. Placing the viewer's eye 210 in the light source SLM image 1048 allows the viewer to see an infinity-focused image of the image SLM 1020.

Preferably, the exit pupil and the ocular pupil have substantially the same size. For example, when the light source SLM 1020 is showing a negative image 1062, the size of the ocular pupil 208 reproduced in the image 1048 of the negative image 1062 is substantially the same size as the actual ocular pupil 208. It will be appreciated that the focal length of the lens of the camera 1050 and the size of the image sensor of that camera 1050 will determine the relative size of the ocular pupil 208 within the captured image of that ocular pupil, and this relative size may be different from the actual size of the ocular pupil 208. Thus, there is a scaling factor between the actual size of the ocular pupil 208 and the size of the ocular pupil 208 within the captured image. In addition, the various lens structures (e.g., the lenses 1010, 1030, 1042, and 1044) between the light source SLM 1000 and the ocular pupil 208 may also have associated scaling factors. All of these scaling factors may be taken into account to produce the image 1048 having an image of the ocular pupil 208 of a desired size at a location coinciding with the pupil position 208. For example, the size of the negative image of the ocular pupil 208 shown on the SLM 1000 may be increased or decreased to provide the image 1048 having the ocular pupil 208 of a desired size.

In some other embodiments, the size of the group of activated light-emitting pixels on the light source SLM 1020 may provide an exit pupil that is smaller or larger than the size of the ocular pupil 208. For example, the intensity values for thresholding may be selected such that both the iris and the pupil of the eye 210 are shown as white pixels in the negative image 1062. As a result, the size of the exit pupil may correspond to the size of the iris of the eye 210. In some other embodiments, as disclosed herein, the size of the light emitting area on the light source SLM 1020 (e.g., the size of the negative of the pupil of the eye 210) may be modified to control the depth of focus of the display system.

It will be appreciated that the light source SLM image 1048 includes a white spot which defines the exit pupil of the display system. Movement of the ocular pupil 208 with the eye 210 may be tracked by continually capturing new images 1052 of the eye 210. In addition, the alignment of the exit pupil of the display system with the ocular pupil 208 may be continually updated (e.g., in real-time) by continually converting the captured images 1052 into negative images 1062 that are displayed on the spatial light modulator 1000. For example, as the ocular pupil 208 shifts in position, this shift is captured in the captured image 1052 which then causes a shift in the position of the high-intensity area of the negative image 1062. This updated negative image 1062 with the shifted high-intensity area is then displayed on the light source SLM 1000, which causes the exit pupil to shift. As a result, changes in position of the ocular pupil 208 cause corresponding changes in the position of the exit pupil. Thus, the exit pupil may be understood to track the position of the ocular pupil 208 substantially in real-time.

Figure 4:
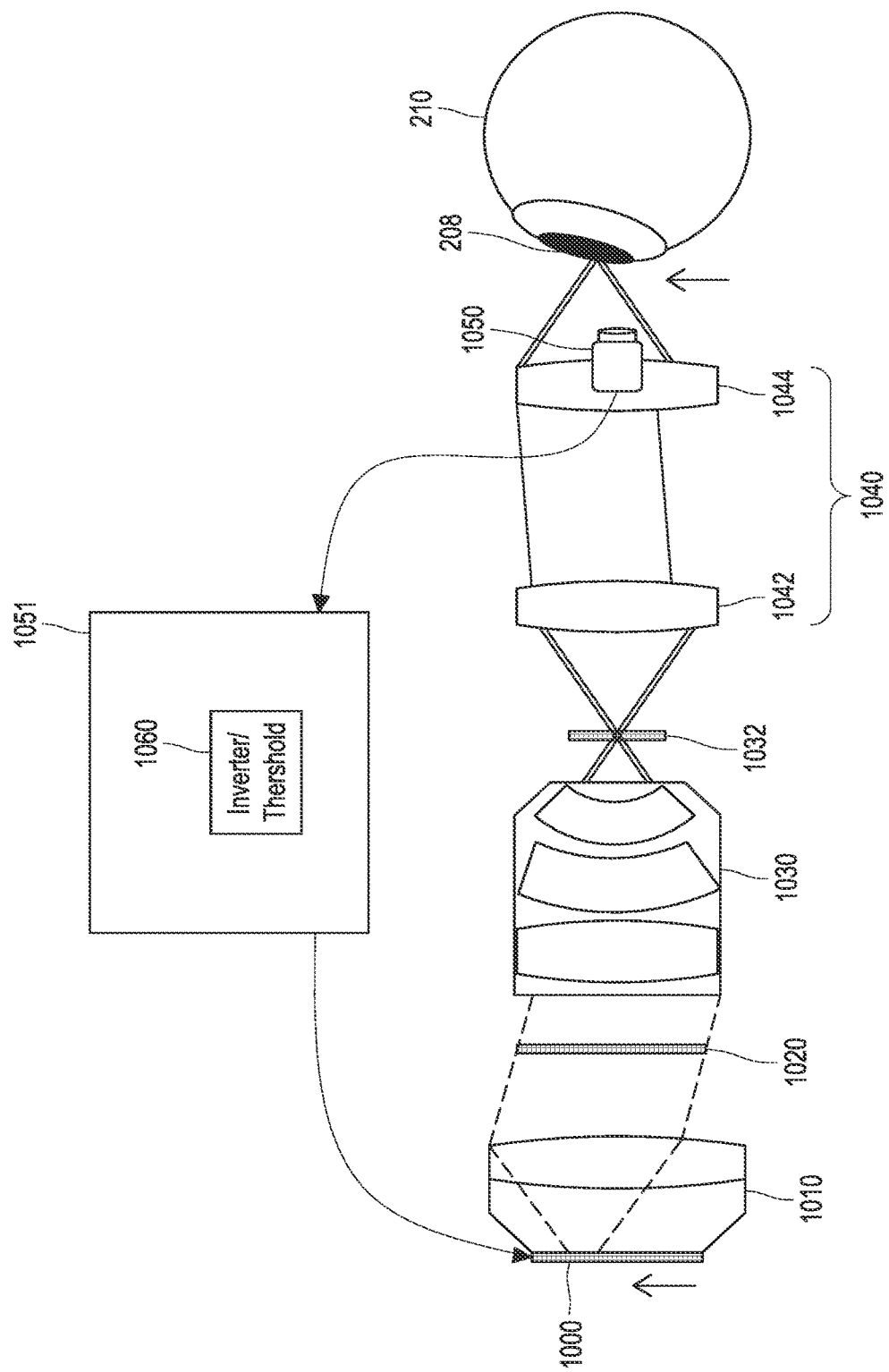
FIG. 4 illustrates an example of the exit pupil of the display system of FIG. 3 tracking movement of the viewer's eye.

FIG. 4 illustrates an example of the exit pupil of the display system of FIG. 3 tracking movement of the viewer's eye. An upward shift in the orientation of the eye 210 may be observed in an image captured by the imaging device 1050. To simplify the illustration, the captured image and the resulting converted negative image are not shown. However, as discussed above regarding FIG. 3, it will be understood that captured images are received by the processing unit 1051 and negatives of those captured images are formed by the inverter 1060. The negative images are provided to and displayed by the light source SLM 1000. Consequently, the upward shift in the orientation of the eye 210 causes a corresponding upward shift in the image of ocular pupil displayed by the light source SLM 1000. The upward shift in the image of the ocular pupil causes an upward shift in the exit pupil, thereby aligning the exit pupil with the ocular pupil 208.

It will be appreciated that augmented reality systems may utilize optical combiners that allow light from the ambient environment to propagate to the viewer's eyes to allow a view of the ambient environment, while also allowing light from a displayed image to also propagate to the user's eyes; that is, light from the ambient environment (the real world) and light containing image information from the display may be combined and both may be received by the viewer's eyes. In some embodiments, the optical combiner may be a light guide (e.g., a waveguide) that is at least partially transparent in the direction of the viewer's gaze, thereby allowing for visibility of the real world. The light guide may also be configured to guide light from the light source SLM 1000 and the image SLM 1020, encoded with image information and output that light towards the viewer's eye 210. It will be appreciated that light may be guided and propagate within the light guide by total internal reflection. Also, throughout this disclosure, a waveguide may be understood to be an example of a light guide.

Figure 5:
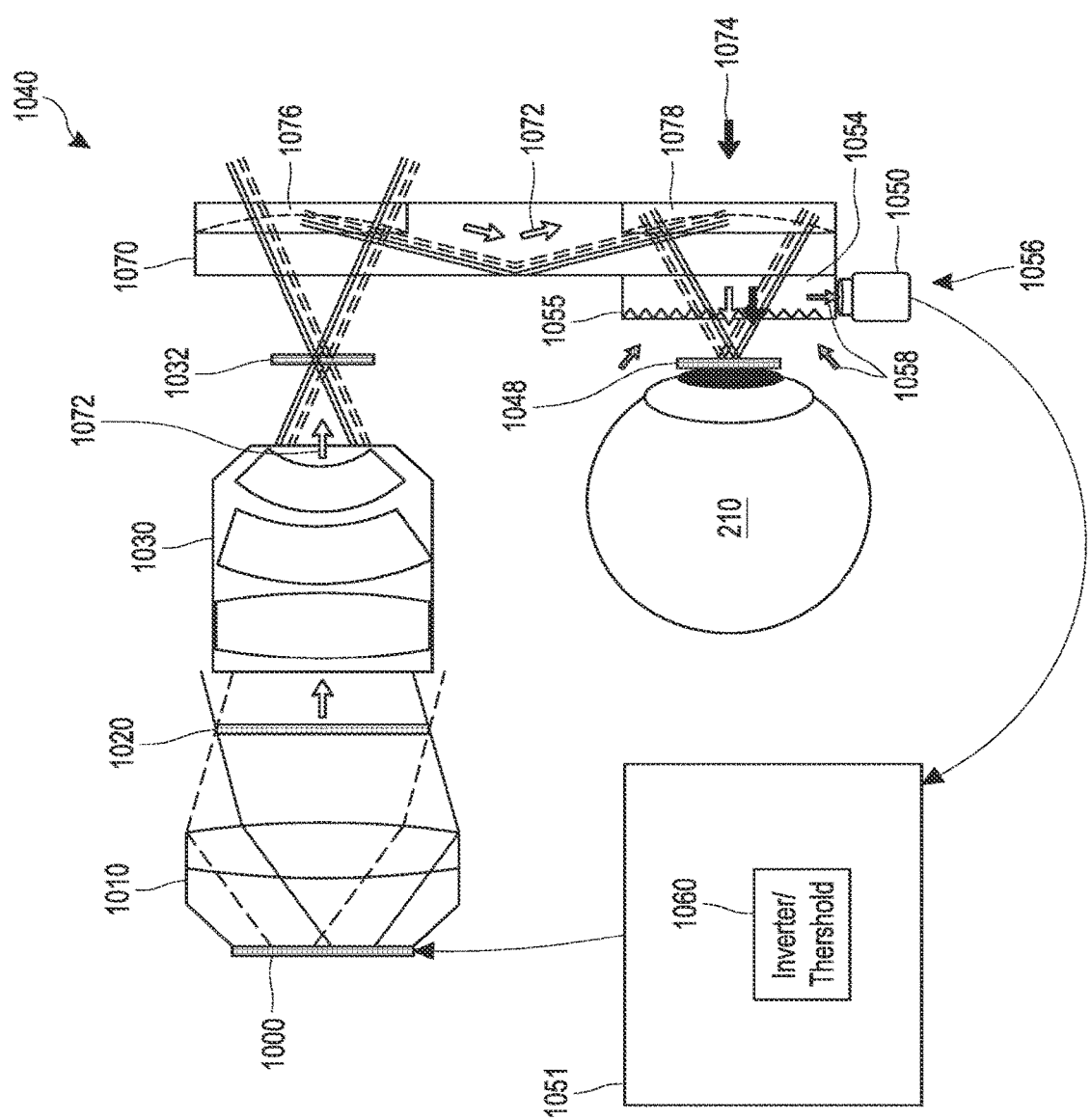
FIG. 5 illustrates an example of a display system with an optical combiner.

FIG. 5 illustrates an example of a display system with an optical combiner. The illustrated display system is similar to that shown in FIGS. 3 and 4, except that the relay lens system 1040 is an optical combiner. As illustrated, the relay lens system 1040 includes a light guide 1070 (e.g., a waveguide) and reflective lens structures 1076 and 1078, which may correspond to the lenses 1042 and 1044 shown in FIGS. 2A-4. The light guide 1070 allows light 1074 from the ambient environment to reach the viewer's eye 210. In addition, the light guide 1070 functions as folded optics that guides light 1072, emitted by the light source SLM 1000 and modified by the image SLM 1020, to the viewer's eyes 210. In some embodiments, the reflective instructors 1076 and 1078 may be partially-transparent curved specular reflectors.

With continued reference to FIG. 5, the imaging device 1050 may be disposed off-axis relative to the gaze direction of the eye 210, e.g., such that the imaging device 1050 is not in the field of view of the eye 210. The imaging device 1050 may be part of an eye imaging assembly 1056 comprising a light guide 1054 (e.g., a waveguide) configured to guide light 1058 from the eye 210 to the imaging device 1050. The light guide 1054 may include in-coupling optical elements 1055 configured to in-couple the light 1058 into the light guide 1054. The in-coupled light 1058 may be guided within the light guide 1054 by total internal reflection until it exits the light guide 1054 towards the imaging device 1050.

In some embodiments, the imaging device 1050 may be configured to image the eye using electromagnetic radiation outside of the visible spectrum. For example, the imaging device 1050 may be configured to image the eye by detecting infrared light. In some embodiments, the imaging device 1050 may also include an infrared light emitter configured to illuminate the eye with infrared light. For example, the imaging device 1050 may include an infrared light emitter which injects light into the light guide 1054 and this infrared light may be ejected out of the light guide 1054 by the optical elements 1055.

Figure 6:
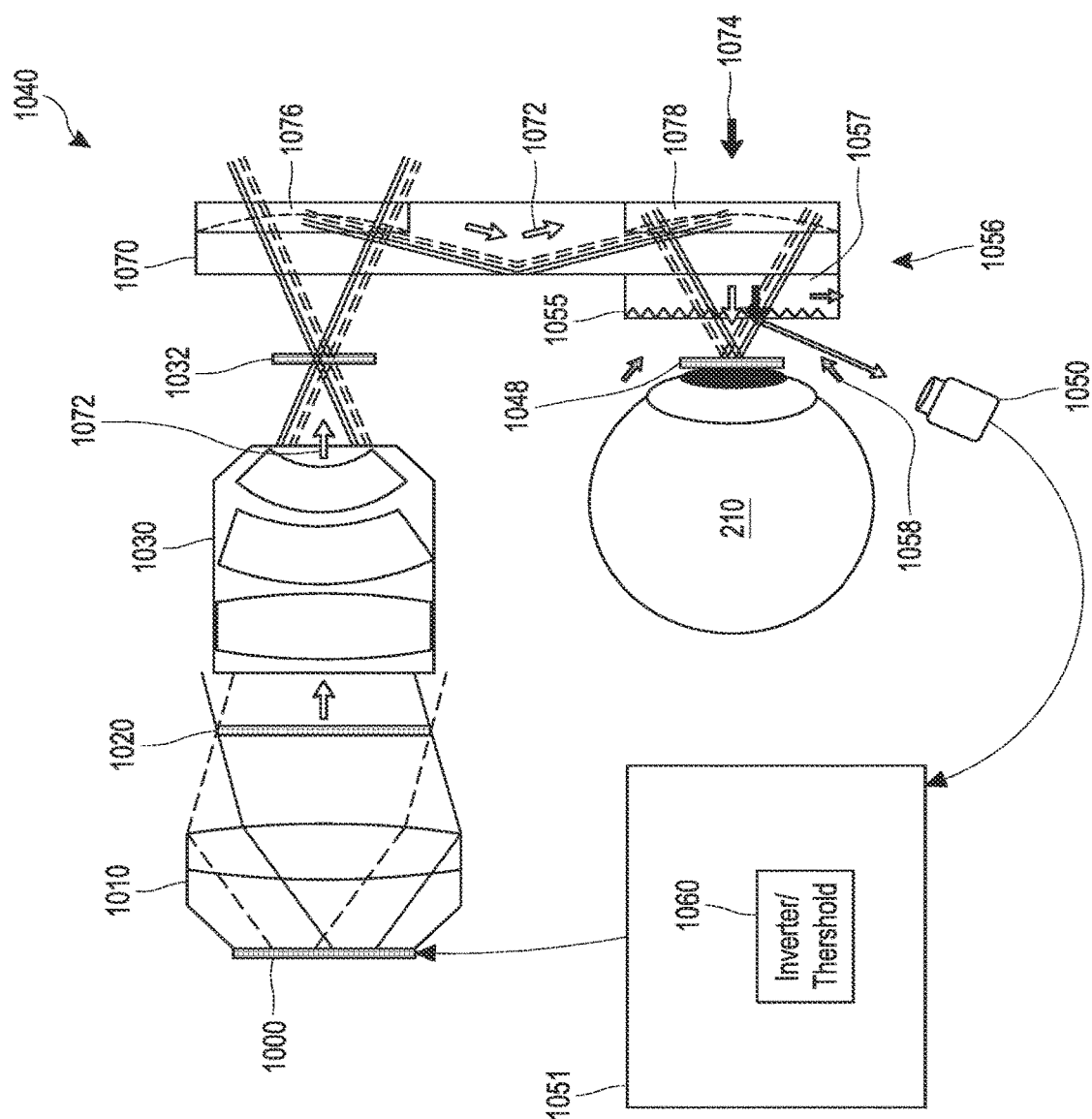
FIG. 6 illustrates an example of the display system of FIG. 5 having an off-axis, mirror based eye imaging device.

FIG. 6 illustrates an example of the display system of FIG. 5 having an off-axis, mirror based eye imaging device. The illustrated display system is similar to that illustrated in FIG. 5, except that light 1058 from the eye 210 is reflected to the imaging device 1050 using a partially reflective and partially transparent mirror 1057. The mirror 1057 may be a specular reflector. In some other embodiments, the mirror 1057 may be an off-axis mirror in which the angle of reflection of light from the mirror is different from the angle of incidence of that light on the mirror. For example, the mirror 1057 may include diffractive optical elements having diffractive structures configured (e.g., oriented and formed) to reflect light from the eye 210 in a direction to be captured by the imaging device 1050, with the angle of incidence of the light from the eye 210 being different from the angle of reflection of that light from the mirror 1057.

With continued reference to FIG. 6, in some embodiments the mirror 1057 may be disposed on the light guide 1070. As noted above, in some embodiments, the imaging device 1050 may be configured to detect electromagnetic radiation, e.g., infrared light, outside of the visible spectrum. In some embodiments, the imaging device 1050 may also include an infrared light emitter to illuminate the eye 210.

Figure 16:
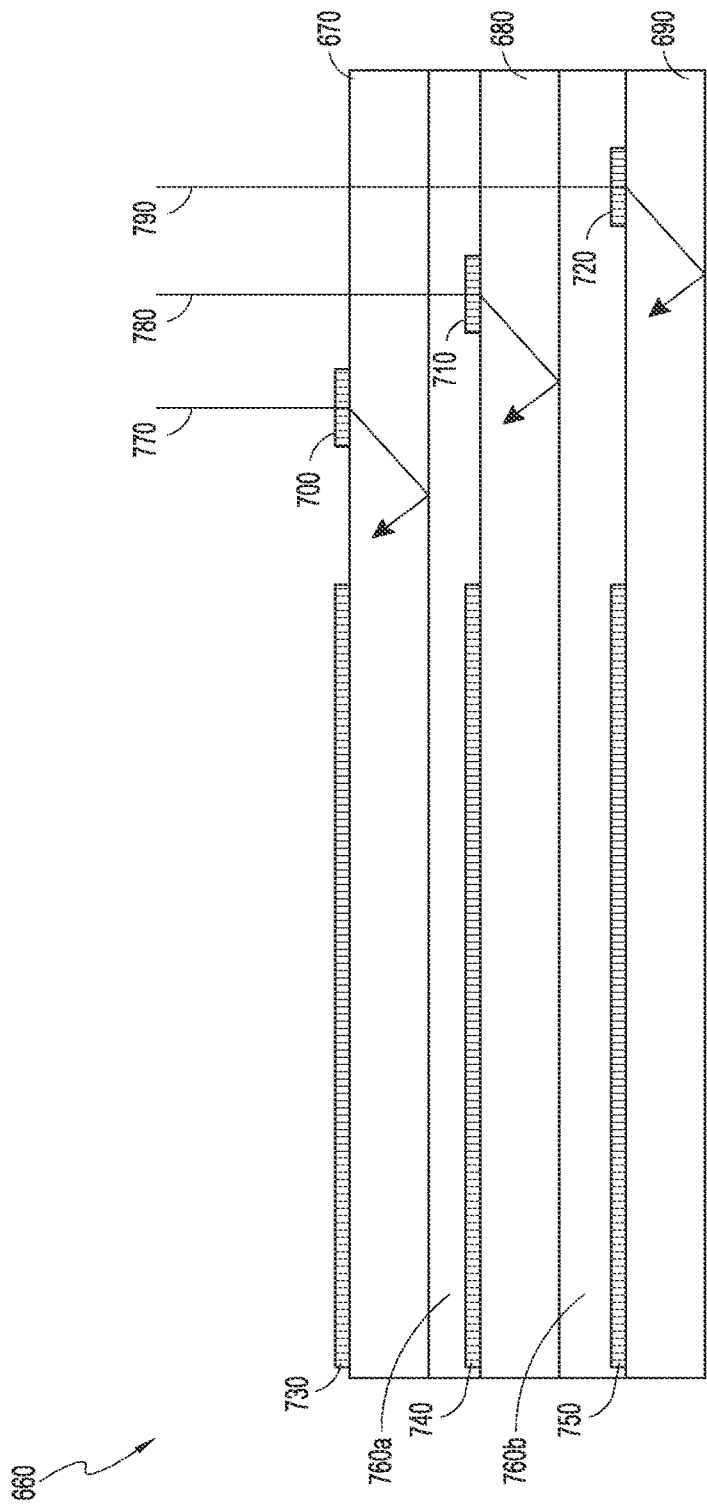
FIG. 16 illustrates a cross-sectional side view of an example of a set of stacked light guides that each includes an incoupling optical element.

In addition to the optical combiner configurations shown in FIGS. 4 and 5, it will be appreciated that the eye tracking and exit pupil alignment system disclosed herein may be utilized in conjunction with various other optical combiners. For example, the optical combiner 1040 may comprise one or more light guides comprising diffractive optical elements for in-coupling and out-coupling light encoded with image information. Examples of such light guides include light guides of the light guide stack 250 (FIG. 14) and 660 (FIG. 16).

As another example, the optical combiner may be a bird-bath optical combiner. In some embodiments, the bird-bath optical combiner may include a beam splitter and a partially-transparent mirror (e.g., a partially-transparent spherical mirror), with the beam splitter directing light encoded with image information to the mirror, which then reflects the light back to the viewer. Both the beam splitter and the partially-transparent mirror may be partially transparent, thereby allowing light from the ambient environment (the outside world) to reach the viewer's eyes. Further details regarding bird-bath optical combiners may be found in US 2015/0346495, published Dec. 3, 2015, the entirety of which is incorporated by reference herein.

Figure 7:
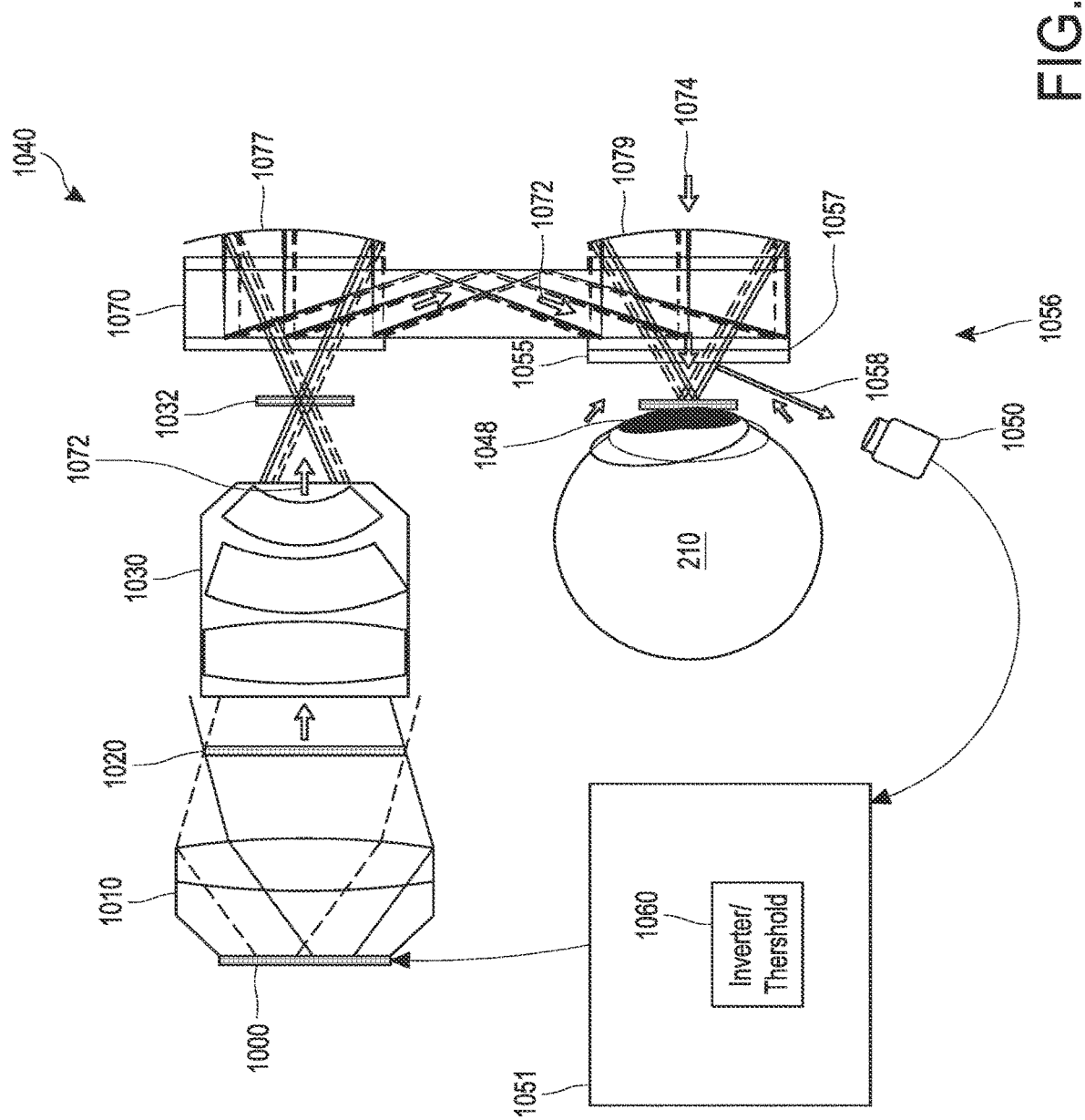
FIG. 7 illustrates an example of a display system with a folded relay mirror combiner.

In another example, FIG. 7 illustrates a display system with a folded relay mirror combiner. The display system of FIG. 7 is similar to that of FIG. 6, except that the relay lens system 1040 comprises folded mirrors 1077 and 1079 in place of the lens structures 1076 and 1078 of FIG. 6. As illustrated, the eye imaging assembly 1056 may comprise a mirror 1057 configured to direct light to the imaging device 1050 to image the eye 210. In some other embodiments, the eye imaging assembly 1056 may comprise the light guide 1054 (FIG. 5) configured to collect and propagate light to the image capture device 1050.

It will be appreciated that FIGS. 2A-7 illustrate systems for providing light and image information to a single eye for ease of illustration and description. It will also be appreciated that, to provide light and image information to two eyes of a viewer, a display system may have two of the illustrated systems, one for each eye.

In addition, in some embodiments, rather than a plurality of light emitters disposed at different locations, the light source 1000 may include one or more light emitters that can change the apparent location of light output, thereby mimicking the light output of a light source having an array of light emitters. For example, the light source may comprise a linear transfer lens such as a F-theta (F-θ or F-tan θ) lens, a common or shared light emitter, and an actuator to direct the light emitted by the light emitter along different paths through the F-theta lens. The light exits the light source at different locations through the F-theta lens, which focuses the exiting light onto an image plane. Light exiting the F-theta lens at different locations is also disposed at different locations on the image plane, and the image plane may be considered to provide a virtual 2D light emitter array. Consequently, the individual regions of the light emitter array, and the locations at which light from the linear transfer lens passes through the image plane may both be considered to be the light output locations of the light source.

In some embodiments, the actuator may be part of a dual axis galvanometer comprising a plurality (e.g., a pair) of mirrors that are independently actuated on different axes to direct light from the light emitter along the desired path of propagation. In some other embodiments, the light source may comprise a fiber scanner and the actuator may be an actuator configured to move the fiber of the fiber scanner. The light source may also comprise or be in communication with a processing module which synchronizes the output of light by the light source with the location of the mirrors or fiber, and with the intra-pupil image to be displayed. For example, the mirrors or fiber may move along a known path and the light emitter may be controlled by the processing module to emit light when the mirrors or fiber are at a position corresponding to a desired light output location for a negative image, as discussed further herein. Examples of such light sources are described in U.S. application Ser. No. 15/789,895 filed on Oct. 20, 2017, the entire disclosure of which is incorporated by reference herein.

Example Display Systems with Accommodation-Vergence Matching

Advantageously, the displays systems disclosed herein may be configured to provide a high level of accommodation-vergence matching, which may provide various benefits, such as for viewing comfort and long-term wearability. For example, in contrast to conventional stereoscopic displays, the eyepiece (e.g., the optical combiner 1040) of the display system may be configured to provide selectively variable amounts of wavefront divergence, which may provide the desired accommodation cues to achieve a match with vergence cues provided by displaying slightly different views to each eye of a viewer.

Figure 8:
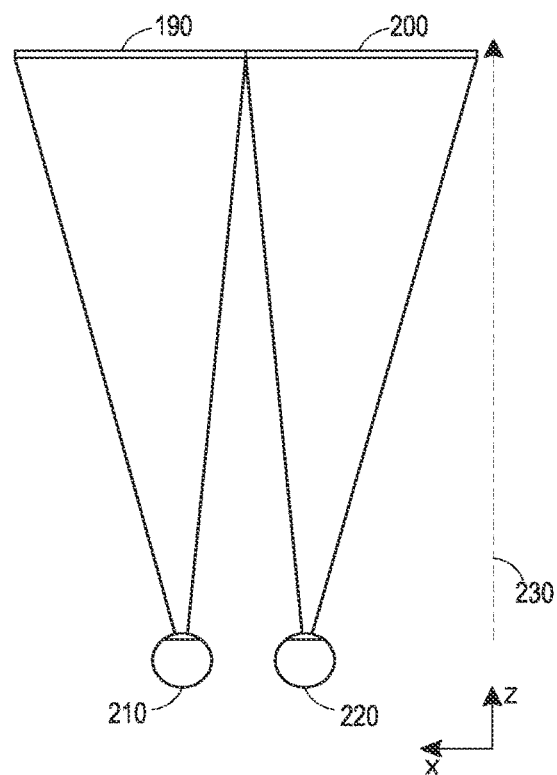
FIG. 8 illustrates a conventional display system for simulating three-dimensional imagery for a user.

FIG. 8 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 8, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 9A:
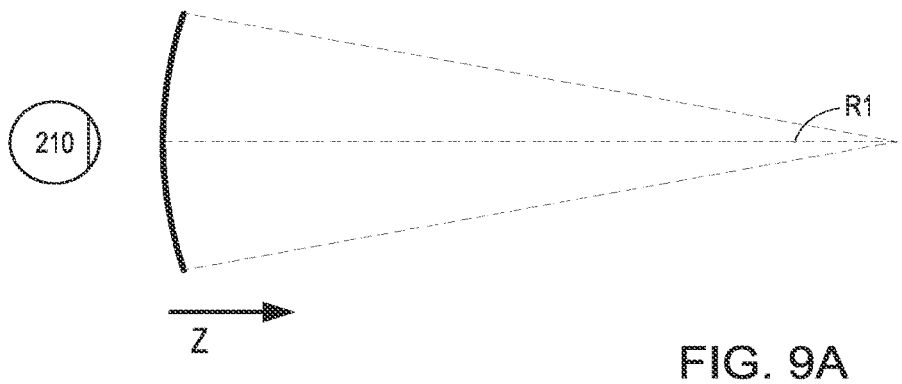
FIGS. 9A-9C illustrate relationships between radius of curvature and focal radius.
Figure 9B:
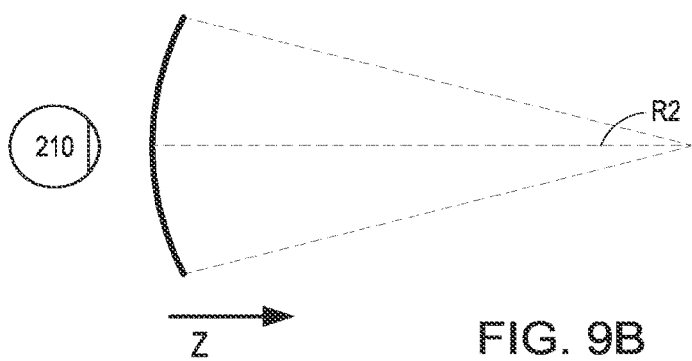
Figure 9C:
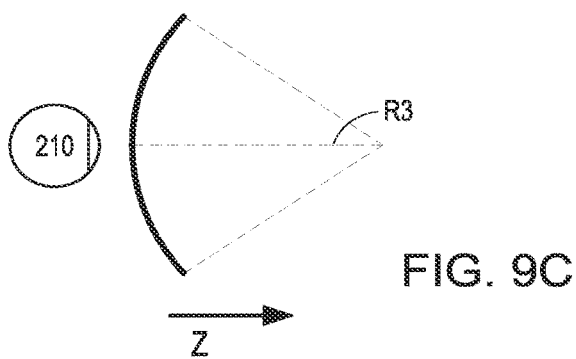

Generating a realistic and comfortable perception of depth is challenging, however. It will be appreciated that light from objects at different distances from the eyes have wavefronts with different amounts of divergence. FIGS. 9A-9C illustrate relationships between distance and the divergence of light rays. The distance between the object and the eye 210 is represented by, in order of decreasing distance, R1, R2, and R3. As shown in FIGS. 9A-9C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 9A-9C and other figures herein, the discussions regarding eye 210 may be applied to both eyes 210 and 220 of a viewer.

With continued reference to FIGS. 9A-9C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 10:
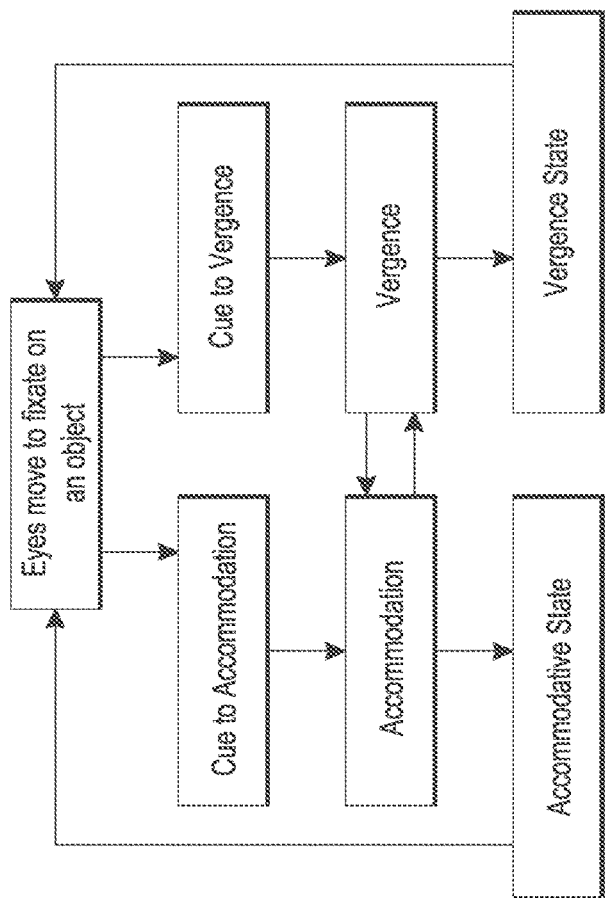
FIG. 10 illustrates a representation of the accommodation-vergence response of the human visual system.

With reference now to FIG. 10, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 10, accommodation may be understood to be the process by which the eye achieves a particular accommodative state, and vergence may be understood to be the process by which the eye achieves a particular vergence state. As indicated in FIG. 10, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 11:
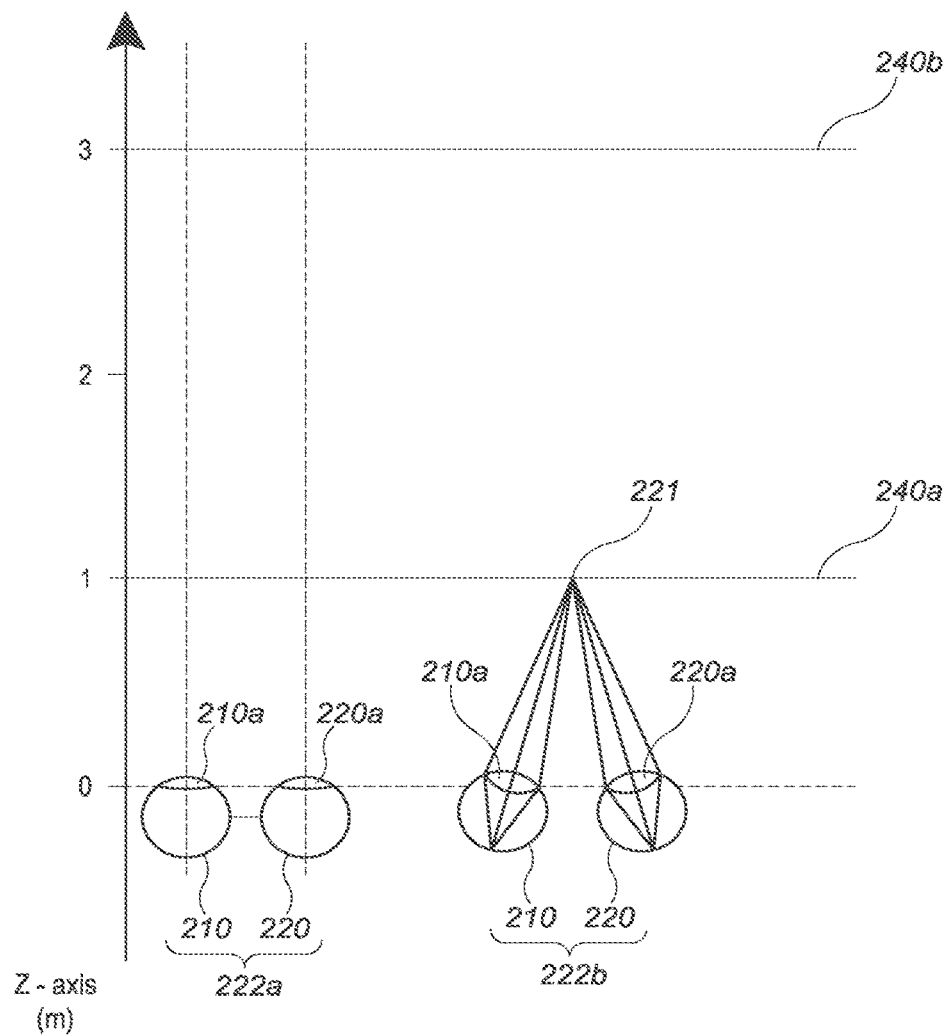
FIG. 11 illustrates examples of different accommodative states and vergence states of a pair of eyes of the user.

With reference now to FIG. 11, examples of different accommodative and vergence states of the eyes are illustrated. The pair of eyes 222a is fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 11, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero-point located at the pupils of the user's eyes. Thus, a depth plane 240 located at a depth of 1 m corresponds to a distance of 1 m away from the pupils of the user's eyes, on the optical axis of those eyes with the eyes directed towards optical infinity. As an approximation, the depth or distance along the z-axis may be measured from the display in front of the user's eyes (e.g., from the surface of a light guide), plus a value for the distance between the device and the pupils of the user's eyes. That value may be called the eye relief and corresponds to the distance between the pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 12A:
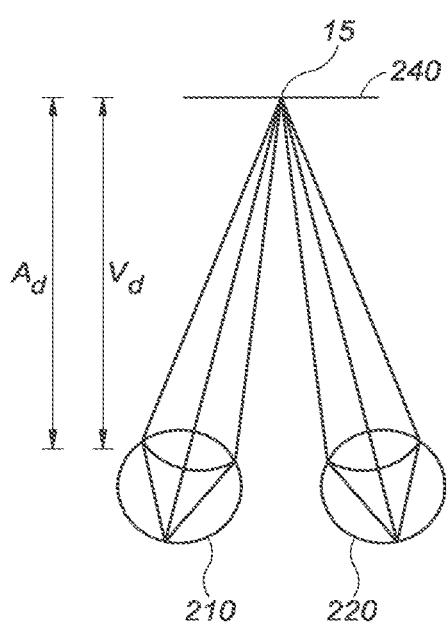
FIG. 12A illustrates an example of a representation of a top-down view of a user viewing content via a display system.
Figure 12B:
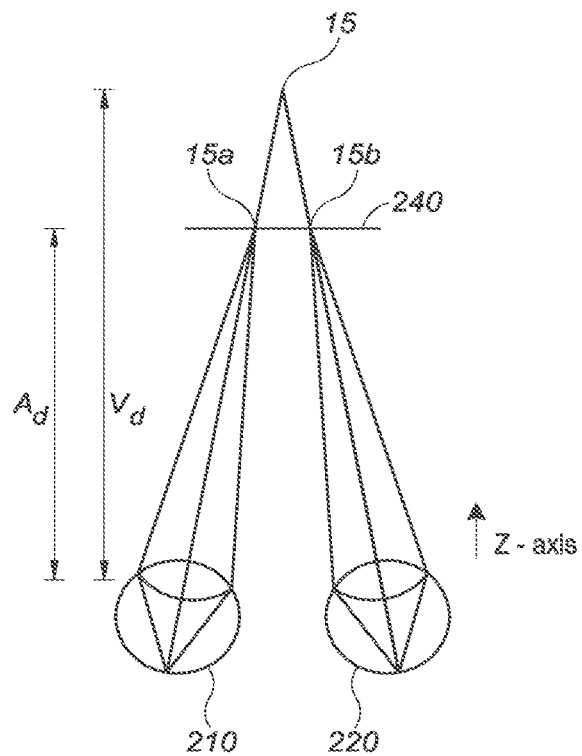
FIG. 12B illustrates another example of a representation of a top-down view of a user viewing content via a display system.

With reference now to FIGS. 12A and 12B, examples of matched accommodation-vergence distances and mismatched accommodation-vergence distances are illustrated, respectively. As illustrated in FIG. 12A, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, $V_d$, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 12B, images displayed to the eyes 210, 220 may be displayed with wavefront divergence corresponding to depth plane 240, and the eyes 210, 220 may assume a particular accommodative state in which the points 15*a*, 15*b* on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the pupils of the eyes 210, 220 to the depth plane 240, while the vergence distance corresponds to the larger distance from the pupils of the eyes 210, 220 to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., $V_d$-$A_d$) and may be characterized using diopters.

In some embodiments, it will be appreciated that a reference point other than pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a light guide of the display device) to the depth plane, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some embodiments, display systems disclosed herein (e.g., the display system 250, FIG. 14) present images to the viewer having accommodation-vergence mismatch of about 0.5 diopter or less. In some other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

Figure 13:
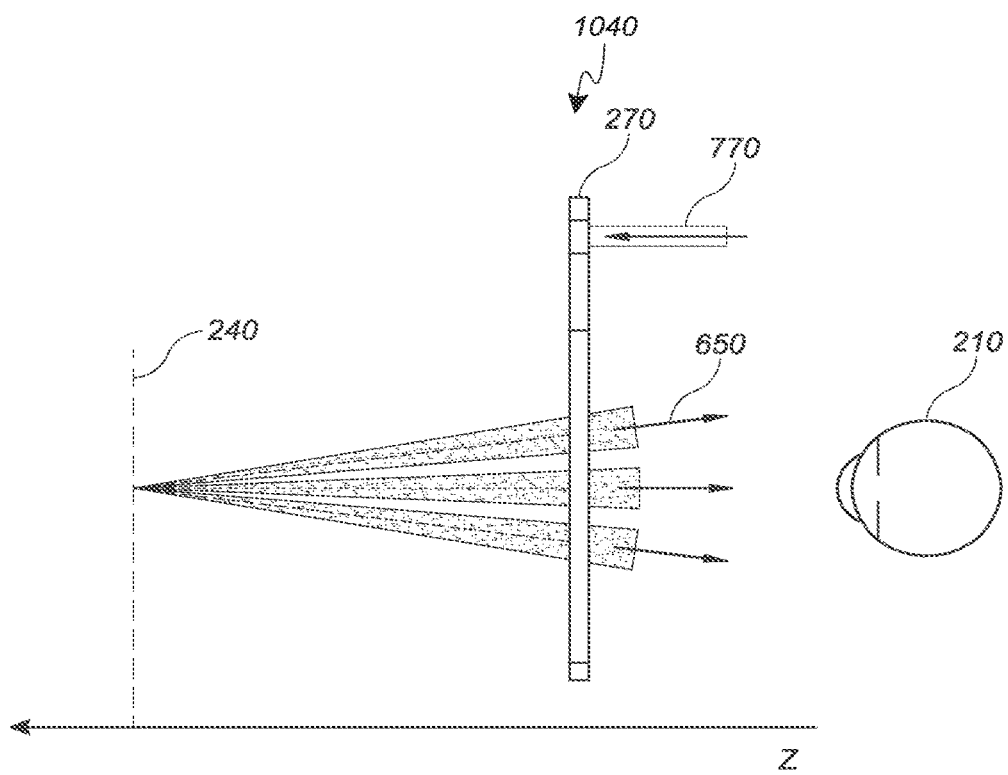
FIG. 13 illustrates aspects of an approach for simulating three-dimensional imagery by modifying wavefront divergence.

FIG. 13 illustrates aspects of an approach for simulating three-dimensional imagery by modifying wavefront divergence. The display system includes an eyepiece 1040 that is configured to receive light 770 that is encoded with image information, and to output that light to the user's eye 210. In some embodiments, the eyepiece 1040 may include a light guide 270 (e.g., a waveguide). The light guide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar light guide.

In some embodiments, a single light guide may be configured to output light with a set amount of wavefront divergence corresponding to a single or limited number of depth planes and/or the light guide may be configured to output light of a limited range of wavelengths. Consequently, in some embodiments, the eyepiece 1040 may include a plurality or stack of light guides may be utilized to provide different amounts of wavefront divergence for different depth planes and/or to output light of different ranges of wavelengths. As used herein, it will be appreciated at a depth plane may follow the contours of a flat or a curved surface. In some embodiments, advantageously for simplicity, the depth planes may follow the contours of flat surfaces.

Figure 14:
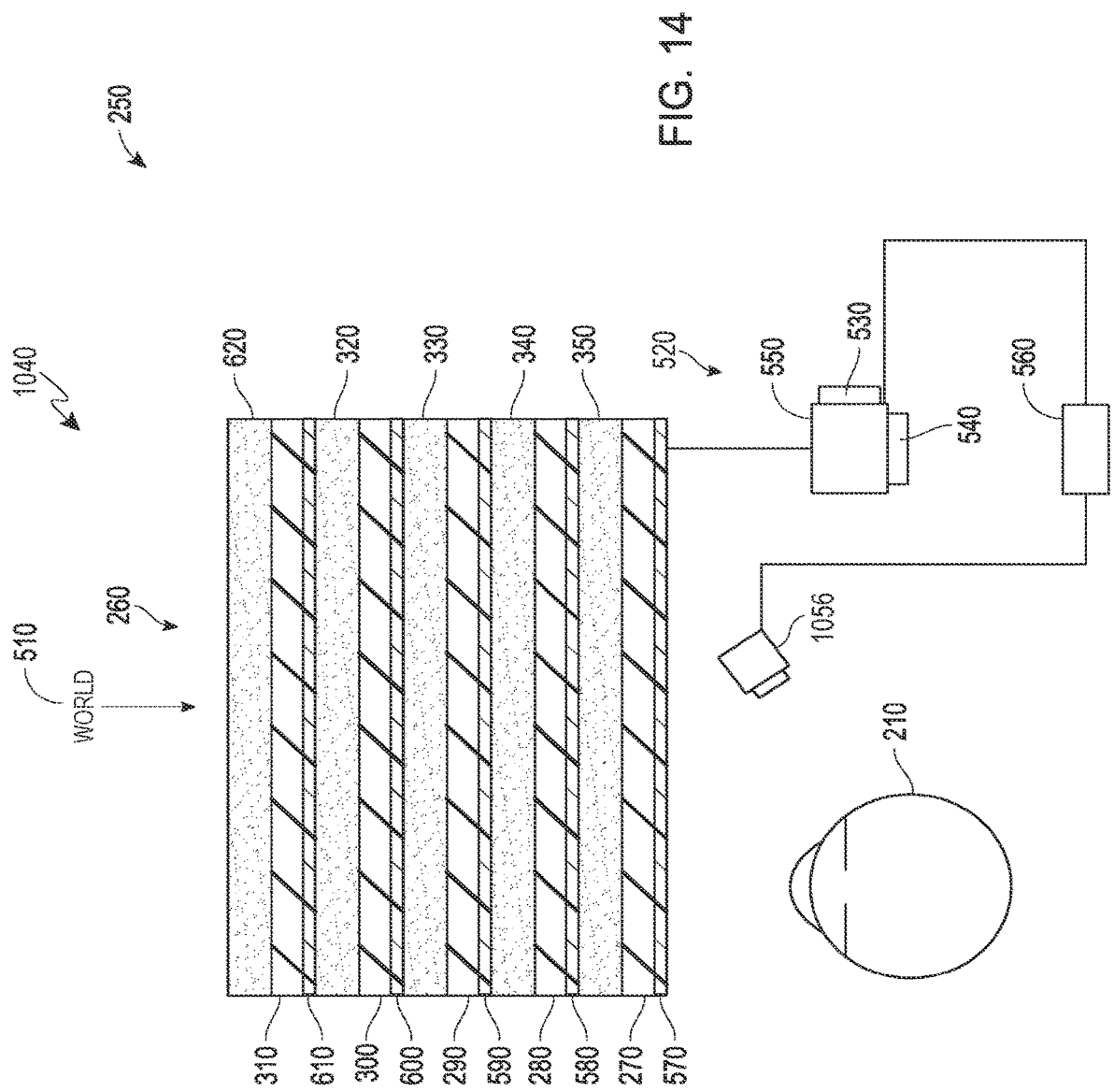
FIG. 14 illustrates an example of a light guide stack for outputting image information to a user.

FIG. 14 illustrates an example of a light guide stack for outputting image information to a user. A display system 250 includes an eyepiece 1040 having a stack of light guides, or stacked light guide assembly, 260 that may be utilized to provide three-dimensional perception to the eye/brain using a plurality of light guides 270, 280, 290, 300, 310. It will be appreciated that the display system 250 may be considered a light field display in some embodiments.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the light guides 270, 280, 290, 300, 310.

With continued reference to FIG. 14, the light guide assembly 260 may also include a plurality of features 320, 330, 340, 350 between the light guides. In some embodiments, the features 320, 330, 340, 350 may be one or more lenses. In some embodiments, the lenses 320, 330, 340, 350 may correspond to the lens 1046 (FIG. 2A). The light guides 270, 280, 290, 300, 310 and/or the plurality of lenses 320, 330, 340, 350 may be configured to send image information to the eye with various levels of wavefront curvature or light ray divergence. Each light guide level may be associated with a particular depth plane and may be configured to output image information corresponding to that depth plane.

In some embodiments, light is injected into the light guides 270, 280, 290, 300, 310 by an image injection system 520, which comprises a light module 530, which may include a light emitter, such as a light emitting diode (LED). The light from the light module 530 may be directed to and modified by a light modulator 540, e.g., a spatial light modulator, via a beam splitter 550. It will be appreciated that the light module 530 may correspond to the light source 1000 and the light modulator 540 may correspond to the image SLM 1020 (FIGS. 2A-7).

The light modulator 540 may be configured to change the perceived intensity of the light injected into the light guides 270, 280, 290, 300, 310 to encode the light with image information. Examples of spatial light modulators include liquid crystal displays (LCD) including liquid crystal on silicon (LCOS) displays. In some embodiments, the image injection system 520 may be a scanning fiber display comprising one or more scanning fibers configured to project light in various patterns (e.g., raster scan, spiral scan, Lissajous patterns, etc.) into one or more light guides 270, 280, 290, 300, 310 and ultimately to the eye 210 of the viewer.

With continued reference to FIG. 14, a controller 560 controls the operation of one or more of the stacked light guide assembly 260, the light source 530, and the light modulator 540. In some embodiments, the controller 560 is part of the local data processing module 140. The controller 560 includes programming (e.g., instructions in a non-transitory medium) that regulates the timing and provision of image information to the light guides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 17) in some embodiments.

With continued reference to FIG. 14, the light guides 270, 280, 290, 300, 310 may be configured to propagate light within each respective light guide by total internal reflection (TIR). The light guides 270, 280, 290, 300, 310 may each be planar or have another shape (e.g., curved), with major top and bottom surfaces, and edges extending between those major top and bottom surfaces. In the illustrated configuration, the light guides 270, 280, 290, 300, 310 may each include out-coupling optical elements 570, 580, 590, 600, 610 that are configured to extract light out of a light guide by redirecting the light, propagating within each respective light guide, out of the light guide to output image information to the eye 210. Extracted light may also be referred to as out-coupled light and the out-coupling optical elements light may also be referred to light extracting optical elements. The out-coupling optical elements 570, 580, 590, 600, 610 may, for example, be gratings, including diffractive optical features, as discussed further herein. While illustrated disposed at the bottom major surfaces of the light guides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the light guides 270, 280, 290, 300, 310, as discussed further herein. In some embodiments, the out-coupling optical elements 570, 580, 590, 600, 610 may be formed in a layer of material that is attached to a transparent substrate to form the light guides 270, 280, 290, 300, 310. In some other embodiments, the light guides 270, 280, 290, 300, 310 may be a monolithic piece of material and the out-coupling optical elements 570, 580, 590, 600, 610 may be formed on a surface and/or in the interior of that piece of material. In some embodiments, the out-coupling optical elements 570, 580, 590, 600, 610 may correspond to the lens structures 1078, 1079 (FIGS. 5-7).

With continued reference to FIG. 14, as discussed herein, each light guide 270, 280, 290, 300, 310 is configured to output light to form an image corresponding to a particular depth plane. For example, the light guide 270 nearest the eye may be configured to deliver collimated light to the eye 210. The collimated light may be representative of the optical infinity focal plane. The next light guide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next light guide up 280 as coming from a first focal plane closer inward toward the eye 210 from optical infinity. Similarly, the third up light guide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third light guide 290 as coming from a second focal plane that is even closer inward toward the person from optical infinity than was light from the next light guide up 280.

The other light guide layers 300, 310 and lenses 330, 320 are similarly configured, with the highest light guide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked light guide assembly 260, a compensating lens layer 620 may be disposed at the top of the stack to compensate for the aggregate power of the lens stack 320, 330, 340, 350 below. Such a configuration provides as many perceived focal planes as there are available light guide/lens pairings. Both the out-coupling optical elements of the light guides and the focusing aspects of the lenses may be static (i.e., not dynamic or electro-active). In some alternative embodiments, either or both may be dynamic using electro-active features.

In some embodiments, two or more of the light guides 270, 280, 290, 300, 310 may have the same associated depth plane. For example, multiple light guides 270, 280, 290, 300, 310 may be configured to output images set to the same depth plane, or multiple subsets of the light guides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 14, the out-coupling optical elements 570, 580, 590, 600, 610 may be configured to both redirect light out of their respective light guides and to output this light with the appropriate amount of divergence or collimation for a particular depth plane associated with the light guide. As a result, light guides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, as discussed herein, an eye imaging assembly 1056 (e.g., a digital camera, including visible light and infrared light cameras) may be provided to capture images of the eye 210. As used herein, a camera may be any image capture device. In some embodiments, the eye imaging assembly 1056 may include an image capture device and a light source to project light (e.g., infrared light) to the eye, which may then be reflected by the eye and detected by the image capture device. In some embodiments, the eye imaging assembly 1056 may be attached to the frame 80 (FIG. 17) and may be in electrical communication with the processing modules 140 and/or 150, which may process image information from the eye imaging assembly 1056. In some embodiments, one eye imaging assembly 1056 may be utilized for each eye, to separately monitor each eye.

Figure 15:
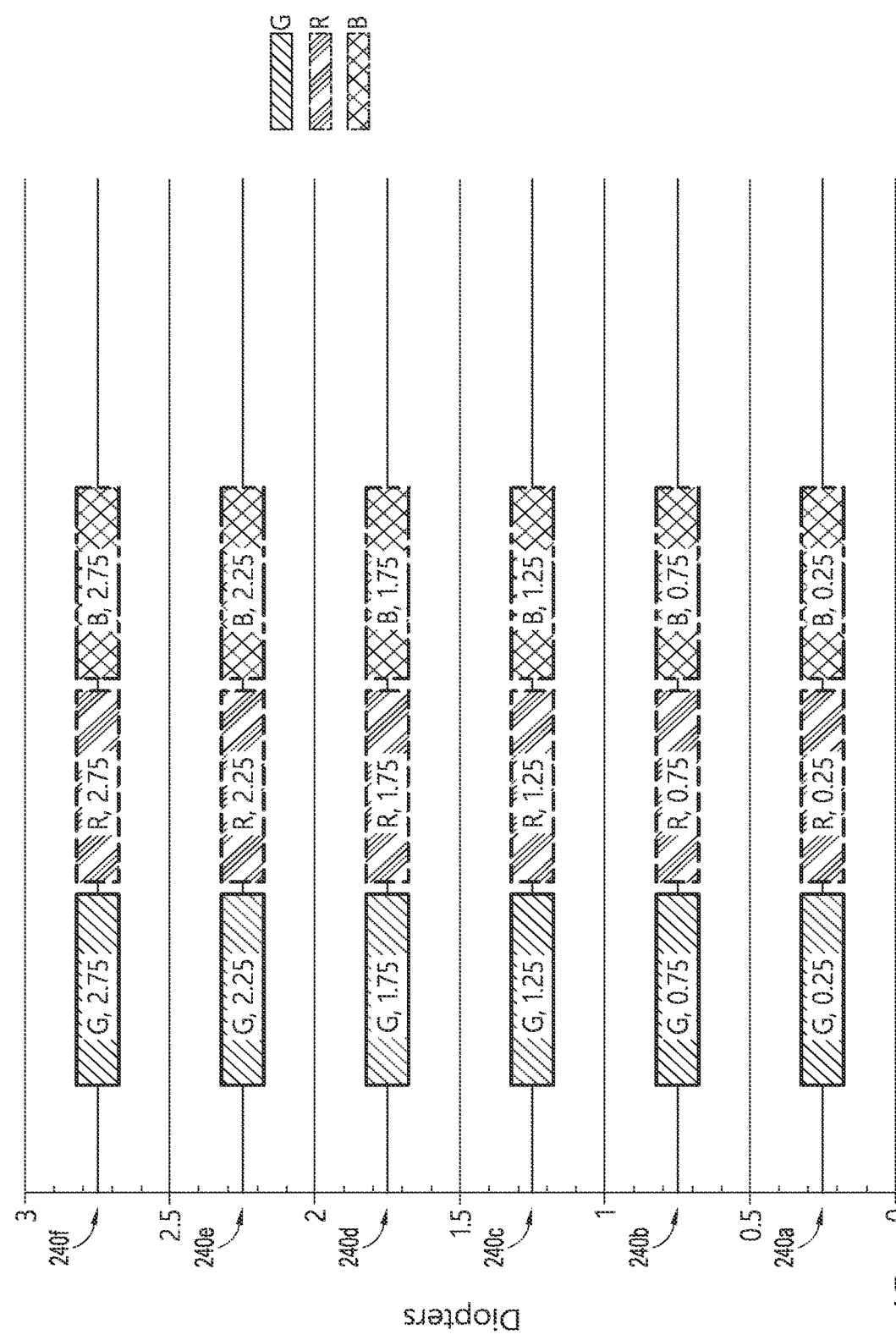
FIG. 15 illustrates an example of a stacked light guide assembly in which each depth plane includes images formed using multiple different component colors.

In some embodiments, a full color image may be formed at each depth plane by overlaying images in each of the component colors, e.g., three or more component colors. FIG. 15 illustrates an example of a stacked light guide assembly in which each depth plane includes images formed using multiple different component colors. The illustrated embodiment shows depth planes 240*a*-240*f*, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated light guide and, consequently, each depth plane may have multiple light guides associated with it. In such embodiments, each box in the figures including the letters G, R, or B may be understood to represent an individual light guide, and three light guides may be provided per depth plane where three component color images are provided per depth plane. While the light guides associated with each depth plane are shown adjacent to one another in this drawing for ease of description, it will be appreciated that, in a physical device, the light guides may all be arranged in a stack with one light guide per level. In some other embodiments, multiple component colors may be outputted by the same light guide, such that, e.g., only a single light guide may be provided per depth plane.

With continued reference to FIG. 15, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 14) may be configured to emit light of one or more wavelengths outside the visual perception range of the viewer, for example, infrared and/or ultraviolet wavelengths. In addition, the in-coupling, out-coupling, and other light redirecting structures of the light guides of the display 250 may be configured to direct and emit this light out of the display towards the user's eye 210, e.g., for imaging and/or user stimulation applications.

With reference now to FIG. 16, in some embodiments, light impinging on a light guide may be redirected to in-couple that light into the light guide. An in-coupling optical element may be used to redirect and in-couple the light into its corresponding light guide. FIG. 16 illustrates a cross-sectional side view of an example of a plurality or set 660 of stacked light guides that each includes an in-coupling optical element. The light guides may each be configured to output light of one or more different wavelengths, or one or more different ranges of wavelengths. It will be appreciated that the stack 660 may correspond to the stack 260 (FIG. 14) and the illustrated light guides of the stack 660 may correspond to part of the plurality of light guides 270, 280, 290, 300, 310.

The illustrated set 660 of stacked light guides includes light guides 670, 680, and 690. Each light guide includes an associated in-coupling optical element (which may also be referred to as a light input area on the light guide), with, e.g., in-coupling optical element 700 disposed on a major surface (e.g., an upper major surface) of light guide 670, in-coupling optical element 710 disposed on a major surface (e.g., an upper major surface) of light guide 680, and in-coupling optical element 720 disposed on a major surface (e.g., an upper major surface) of light guide 690. In some embodiments, one or more of the in-coupling optical elements 700, 710, 720 may be disposed on the bottom major surface of the respective light guide 670, 680, 690 (particularly where the one or more in-coupling optical elements are reflective, deflecting optical elements). As illustrated, the in-coupling optical elements 700, 710, 720 may be disposed on the upper major surface of their respective light guide 670, 680, 690 (or the top of the next lower light guide), particularly where those in-coupling optical elements are transmissive, deflecting optical elements. In some embodiments, the in-coupling optical elements 700, 710, 720 may be disposed in the body of the respective light guide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective light guide 670, 680, 690, it will be appreciated that the in-coupling optical elements 700, 710, 720 may be disposed in other areas of their respective light guide 670, 680, 690 in some embodiments. The in-coupling optical elements 700, 710, 720 may correspond to the lens structures 1076, 1077 (FIGS. 5-7).

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different SLM or a different part of an image SLM, and may be separated (e.g., laterally spaced apart) from other in-coupling optical elements 700, 710, 720 such that it substantially does not receive light incident on other ones of the in-coupling optical elements 700, 710, 720. In addition, each in-coupling optical element 700, 710, 720 may have a dedicated associated SLM to display negative images of the viewer's eye, or may display the negative images at different parts of the light source SLM 1000 corresponding to individual ones of the in-coupling optical elements 700, 710, 720. In some embodiments, each in-coupling optical element 700, 710, 720 may have dedicated associated optical elements, including dedicated associated light source condensing/collimating optics and relay optics in the path of the light from the displayed negative image to the corresponding in-coupling optical element 700, 710, or 720.

The light guides 670, 680, 690 may be spaced apart and separated by, e.g., gas, liquid, and/or solid layers of material. For example, as illustrated, layer 760a may separate light guides 670 and 680; and layer 760b may separate light guides 680 and 690. In some embodiments, the layers 760a and 760b are formed of low refractive index materials (that is, materials having a lower refractive index than the material forming the immediately adjacent one of light guides 670, 680, 690). Preferably, the refractive index of the material forming the layers 760a, 760b is 0.05 or more, or 0.10 or less than the refractive index of the material forming the light guides 670, 680, 690. Advantageously, the lower refractive index layers 760a, 760b may function as cladding layers that facilitate total internal reflection (TIR) of light through the light guides 670, 680, 690 (e.g., TIR between the top and bottom major surfaces of each light guide). In some embodiments, the layers 760a, 760b are formed of air. While not illustrated, it will be appreciated that the top and bottom of the illustrated set 660 of light guides may include immediately neighboring cladding layers.

Preferably, for ease of manufacturing and other considerations, the material forming the light guides 670, 680, 690 are similar or the same, and the material forming the layers 760a, 760b are similar or the same. In some embodiments, the material forming the light guides 670, 680, 690 may be different between one or more light guides, and/or the material forming the layers 760a, 760b may be different, while still holding to the various refractive index relationships noted above.

With continued reference to FIG. 16, light rays 770, 780, 790 are incident on the set 660 of light guides. In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the light guides 670, 680, 690 by TIR. In some embodiments, the in-coupling optical elements 700, 710, 720 each selectively deflect one or more particular wavelengths of light, while transmitting other wavelengths to an underlying light guide and associated in-coupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 16, the deflected light rays 770, 780, 790 are deflected so that they propagate through a corresponding light guide 670, 680, 690; that is, the in-coupling optical elements 700, 710, 720 of each light guide deflects light into that corresponding light guide 670, 680, 690 to in-couple light into that corresponding light guide. The light rays 770, 780, 790 are deflected at angles that cause the light to propagate through the respective light guide 670, 680, 690 by TIR. The light rays 770, 780, 790 then impinge on the out-coupling optical elements 800, 810, 820, respectively. In some embodiments, the out-coupling optical elements 800, 810, 820 may correspond to the lens structures 1078, 1079 (FIGS. 5-7).

Accordingly, with reference to FIG. 16, in some embodiments, the set 660 of light guides includes light guides 670, 680, 690; in-coupling optical elements 700, 710, 720; and out-coupling optical elements 800, 810, 820 for each component color. The light guides 670, 680, 690 may be stacked with an air gap/cladding layer between each one. The in-coupling optical elements 700, 710, 720 redirect or deflect incident light (with different in-coupling optical elements receiving light of different wavelengths) into its light guide. The light then propagates at an angle which will result in TIR within the respective light guide 670, 680, 690. In the example shown, light ray 770 (e.g., blue light) is deflected by the first in-coupling optical element 700, and then continues to bounce down the light guide and then interact with the out-coupling optical element 800. The light rays 780 and 790 (e.g., green and red light, respectively) will pass through the light guide 670, with light ray 780 impinging on and being deflected by in-coupling optical element 710. The light ray 780 then bounces down the light guide 680 via TIR, proceeding on to the out-coupling optical element 810. Finally, light ray 790 (e.g., red light) passes through the light guide 690 to impinge on the light in-coupling optical elements 720 of the light guide 690. The light in-coupling optical elements 720 deflect the light ray 790 such that the light ray propagates to the out-coupling optical element 820 by TIR. The out-coupling optical element 820 then finally out-couples the light ray 790 to the viewer, who may also receive the out-coupled light from the other light guides 670, 680.

FIG. 17 illustrates an example of wearable display system 60 into which the various light guides and related systems disclosed herein may be integrated. In some embodiments, the display system 60 is the system 250 of FIG. 14, with FIG. 14 schematically showing some parts of that system 60 in greater detail. For example, the light guide assembly 260 of FIG. 14 may be part of the display 70.

With continued reference to FIG. 17, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system 60 may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system 60 may further include one or more outwardly-directed environmental sensors 112 configured to detect objects, stimuli, people, animals, locations, or other aspects of the world around the user. For example, environmental sensors 112 may include one or more cameras, which may be located, e.g., facing outward so as to capture images similar to at least a portion of an ordinary field of view of the user 90. In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 17, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 17, in some embodiments, the remote processing module 150 may comprise one or more processors configured to analyze and process data and/or image information, for instance including one or more central processing units (CPUs), graphics processing units (GPUs), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Computer Vision to Detect Objects or Features in Captured Images

As discussed above, the display system may be configured to detect objects or features in captured images. In some embodiments, objects or features present in the images may be detected using computer vision techniques. For example, the display system may be configured to perform image analysis on the captured images to determine the presence of particular objects or features in those images. The display system may analyze the captured images to determine the presence and contours of the ocular pupil in some embodiments.

One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

Machine Learning

A variety of machine learning algorithms may be used to learn to identify the presence, shape, location, etc. of the ocular pupil. Once trained, the machine learning algorithms may be stored by the display system. Some examples of machine learning algorithms may include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models may be customized for individual data sets. For example, the display system may generate or store a base model. The base model may be used as a starting point to generate additional models specific to a data type (e.g., a particular user), a data set (e.g., a set of additional images obtained), conditional situations, or other variations. In some embodiments, the display system may be configured to utilize a plurality of techniques to generate models for analysis of the aggregated data. Other techniques may include using pre-defined thresholds or data values.

The criteria for detecting an object or feature may include one or more threshold conditions. If the analysis of the captured image indicates that a threshold condition is passed, the display system may provide a signal indicating the detection the presence of the object in the image. The threshold condition may involve a quantitative and/or qualitative measure. For example, the threshold condition may include a score or a percentage associated with the likelihood of the object being present in the image. The display system may compare the score calculated from the captured image with the threshold score. If the score is higher than the threshold level, the display system may detect the presence of the object or feature. In some other embodiments, the display system may signal the absence of the object in the image if the score is lower than the threshold.

It will be appreciated that each of the processes, methods, and algorithms described herein and/or depicted in the figures may be embodied in, and fully or partially automated by, code modules executed by one or more physical computing systems, hardware computer processors, application-specific circuitry, and/or electronic hardware configured to execute specific and particular computer instructions. For example, computing systems may include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some embodiments, particular operations and methods may be performed by circuitry that is specific to a given function.

Further, certain embodiments of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. In some embodiments, the non-transitory computer-readable medium may be part of one or more of the local processing and data module (140), the remote processing module (150), and remote data repository (160). The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities may be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto may be performed in other sequences that are appropriate, for example, in serial, in parallel, or in some other manner. Tasks or events may be added to or removed from the disclosed example embodiments. Moreover, the separation of various system components in the embodiments described herein is for illustrative purposes and should not be understood as requiring such separation in all embodiments. It should be understood that the described program components, methods, and systems may generally be integrated together in a single computer product or packaged into multiple computer products.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:

1. A method for displaying image content through a wearable display system, the method comprising:
   accessing one or more images of an eye of a user of the wearable display system;
   emitting light to form a negative image of the eye based at least partly on the one or more images of the eye; and
   displaying the image content to the user by encoding image information for the image content in the light propagating from the negative image of the eye.

2. The method of claim 1, wherein encoding the image information for the image content in the light propagating from the negative image of the eye comprises modulating the light propagating from the negative image of the eye to display the image content.

3. The method of claim 2, wherein modulating the light comprises propagating the light through a spatial light modulator.

4. The method of claim 1, wherein emitting light to form the negative image of the eye comprises inverting intensity values of pixels of the one or more images of the eye.

5. The method of claim 4, wherein displaying the image content to the user comprises displaying at least one of the one or more images of the eye with the inverted intensity values.

6. The method of claim 1, further comprising thresholding at least one of the one or more images of the eye to convert the at least one image to the corresponding negative image of the eye.

7. The method of claim 1, wherein the light to form the negative image of the eye is emitted from a light source that includes a spatial light modulator.

8. The method of claim 7, wherein the spatial light modulator is an emissive spatial light modulator.

9. The method of claim 8, wherein the emissive spatial light modulator is an LED array.

10. The method of claim 8, wherein the emissive spatial light modulator comprises an array of binary light emitters each having an on state and an off state.

11. The method of claim 1, wherein the one or more images of the eye are captured by an eye imaging device of the wearable display system, the eye imaging device comprising a camera.

12. The method of claim 11, wherein the eye imaging device further comprises a waveguide configured to receive light from the eye and propagate the light by total internal reflection through the waveguide to the camera.

13. The method of claim 12, wherein the waveguide is in a path of light encoded with the image information, and wherein the waveguide is transmissive to the light encoded with the image information.

14. The method of claim 11, wherein the eye imaging device further comprises a mirror configured to reflect light from the eye to the camera.

15. The method of claim 1, further comprising collimating the light that forms the negative image of the eye.

16. The method of claim 1, wherein the negative image of the eye defines a location of an exit pupil of a display of the display system.

17. The method of claim 16, wherein emitting light to form the negative image of the eye continuously aligns the exit pupil of the display with the pupil of the eye of the user.

18. One or more non-transitory computer-readable storage media storing instructions which, when executed by at least one processor, cause the at least one processor to perform operations for displaying image content through a wearable display system, the operations comprising:
   accessing one or more images of an eye of a user of the wearable display system;
   emitting light to form a negative image of the eye based at least partly on the one or more images of the eye; and
   displaying the image content to the user by encoding image information for the image content in the light propagating from the negative image of the eye.

19. The one or more non-transitory computer-readable storage media of claim 18, wherein encoding the image information for the image content in the light propagating from the negative image of the eye comprises modulating the light propagating from the negative image of the eye to display the image content.

20. The one or more non-transitory computer-readable storage media of claim 18, wherein emitting light to form the negative image of the eye comprises inverting intensity values of pixels of the one or more images of the eye.

* * * * *